(12) United States Patent
Murayama et al.

(10) Patent No.: US 7,204,410 B2
(45) Date of Patent: **\*Apr. 17, 2007**

(54) INFORMATION PROCESSING APPARATUS AND METHOD, INFORMATION PROCESSING SYSTEM, AND MEDIUM

(75) Inventors: Yuji Murayama, Tokyo (JP); Susumu Kusakabe, Kanagawa (JP); Katsuyuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/134,738

(22) Filed: May 20, 2005

(65) Prior Publication Data

US 2005/0205659 A1    Sep. 22, 2005

Related U.S. Application Data

(63) Continuation of application No. 09/567,509, filed on May 8, 2000, now Pat. No. 6,966,490.

(30) Foreign Application Priority Data

May 17, 1999 (JP) ............................. P11-135212
Aug. 27, 1999 (JP) ............................. P11-240669

(51) Int. Cl.
G06F 17/00 (2006.01)
G06K 5/00 (2006.01)

(52) U.S. Cl. ............... 235/375; 235/382; 235/379; 235/435; 235/472.02

(58) Field of Classification Search ................ 235/375, 235/382, 379, 435, 472.02
See application file for complete search history.

(56) References Cited

U.S. PATENT DOCUMENTS

| | | | | |
|---|---|---|---|---|
| 4,351,188 A * | 9/1982 | Fukushima et al. | ....... | 73/170.13 |
| 4,809,421 A * | 3/1989 | Justice | .................... | 29/525.02 |
| 4,929,778 A * | 5/1990 | Roling | .......................... | 585/3 |
| 5,119,088 A * | 6/1992 | Kemp et al. | ........... | 340/825.52 |
| 5,204,675 A * | 4/1993 | Sekine | ........................ | 340/933 |
| 5,253,162 A * | 10/1993 | Hassett | ....................... | 342/457 |
| 5,448,242 A * | 9/1995 | Sharpe et al. | ................. | 342/42 |
| 5,485,520 A * | 1/1996 | Chaum et al. | ................. | 705/74 |
| 5,554,984 A * | 9/1996 | Shigenaga et al. | .......... | 340/937 |
| 5,623,258 A * | 4/1997 | Dorfman | ................. | 340/10.41 |
| 5,640,151 A * | 6/1997 | Reis et al. | ................. | 340/10.2 |

(Continued)

Primary Examiner—Daniel Walsh
(74) Attorney, Agent, or Firm—Bell, Boyd & Lloyd LLP

(57) ABSTRACT

A structure of a system using an IC card is simplified. A controller and active antennas are connected to each other through a bus. The controller transmits a command outputted from a host computer and including an ID for discriminating the active antennas to all the active antennas connected to the bus. The respective active antennas judge whether or not the received command is directed to itself by checking the contained ID. In the case where it is judged that the command is directed to itself, transfer of data to the IC card is performed, and the result is transferred to the controller through the active antenna and the bus.

16 Claims, 24 Drawing Sheets

U.S. PATENT DOCUMENTS

| | | | |
|---|---|---|---|
| 5,742,237 A * | 4/1998 | Bledsoe | 340/825.49 |
| 5,774,795 A * | 6/1998 | Ando | 455/106 |
| 5,952,940 A * | 9/1999 | Matsumoto | 340/905 |
| 5,962,833 A * | 10/1999 | Hayashi | 235/384 |
| 5,969,641 A * | 10/1999 | Nakamura et al. | 340/928 |
| 6,046,683 A * | 4/2000 | Pidwerbetsky et al. | 340/10.4 |
| 6,052,068 A * | 4/2000 | Price et al. | 340/933 |
| 6,057,756 A * | 5/2000 | Engellenner | 340/505 |
| 6,057,759 A * | 5/2000 | Marsh | 340/539.11 |
| 6,084,530 A * | 7/2000 | Pidwerbetsky et al. | 340/10.32 |
| 6,127,917 A * | 10/2000 | Tuttle | 340/10.1 |
| 6,150,921 A * | 11/2000 | Werb et al. | 340/10.1 |
| 6,184,777 B1 * | 2/2001 | Mejia | 340/10.1 |
| 6,353,406 B1 * | 3/2002 | Lanzl et al. | 342/118 |
| 2002/0063622 A1 * | 5/2002 | Armstrong et al. | 340/10.31 |
| 2002/0130775 A1 * | 9/2002 | Engellenner | 340/540 |
| 2003/0001726 A1 * | 1/2003 | Moore | 340/10.3 |
| 2003/0122685 A1 * | 7/2003 | Tuttle | 340/825.49 |
| 2005/0206523 A1 * | 9/2005 | Engellenner | 340/572.1 |

* cited by examiner

PREAMBLE SINK LENGTH CHECKSUM OF LENGTH DATA MAIN BODY CHECKSUM OF DATA POSTAMBLE

INFORMATION PROCESSING APPARATUS AND METHOD, INFORMATION PROCESSING SYSTEM, AND MEDIUM

CROSS REFERENCE TO RELATED APPLICATIONS

The present application is a continuation of U.S. patent application Ser. No. 09/567,509 filed on May 8, 2000 now U.S. Pat. No. 6,966,490, the disclosure of which is herein incorporated by reference. The present application claims priority to Japanese Patent Application No. P11-135212 filed on May 17, 1999 and Japanese Patent Application No. P11-240669 filed on Aug. 27, 1999, the disclosures of which are herein incorporated by reference.

BACKGROUND

The present invention relates to an information processing apparatus and method, an information processing system, and a medium, and particularly to an information processing apparatus and method, an information processing system, and a medium suitable for use in a system using a non-contact type IC card.

In recent years, it has become popular to use a non-contact type IC (Integrated Circuit) card at the time of passing through a ticket gate of public transport, at the time of opening or closing a door required for identification in a building, at the time of using a terminal connected to a network, at the time of performing merchandise control or stock control in a factory or warehouse, or the like. FIG. 1 is a block diagram showing a system in which the non-contact type IC card (hereinafter, simply abbreviated to an IC card) is used. A host computer 1 is constructed by a personal computer or the like, and controls the whole, and a data conversion device 2 converts a command from the host computer 1 or a response from an antenna 3 into data having a format suitable for each device to which output is made. The antenna 3 performs transfer of information to an IC card 4 in a non-contact manner (by wireless).

The IC 4 card is constituted by a communication portion 5, a processing portion 6, and a storage portion 7. A command outputted from the antenna 3 is received by the communication portion 5 of the IC card 4, and the processing portion 6 analyzes the received command. The storage portion 7 stores predetermined information which is read out by the processing portion 6 as needed. The read information is transmitted to the antenna 3 through the communication portion 5.

The host computer 1 is connected to the data conversion device 2 through wire, and transfer of data is performed with a digital signal. FIG. 2 shows a data structure of data transferred between the host computer 1 and the data conversion device 2. The data is constituted by a preamble, sink, length, checksum of length, data main body, checksum of data, and postamble. When data is transmitted from the host computer 1 to the data conversion device 2, which requests readout of data from the IC card 4, the data main body portion of the former data includes a code of a command meaning readout, a memory address where the objective data of readout are written in the IC card 4, and the like. When it is requested to write data in the IC card 4, the data main body portion of data includes a code of a command meaning writing, the objective data of writing, and the like.

On the contrary, when data are transmitted from the data conversion device 2 to the host computer 1 as a response to a command to request readout of data from the IC card 4, the data main body portion includes the data read out from the IC card 4. In the data main body portion at the time of response to a command to request writing of data in the IC card 4, a status indicating whether or not writing of data in the IC card 4 succeeded, or the like is included.

FIG. 3 is a block diagram showing an internal structure of the data conversion device 2. An interface 11 interfaces data to the host computer 1. A digital circuit portion 12 is a circuit including a CPU (Central Processing Unit) (not shown), and analyzes data outputted from the host computer 1 and interfaced by the interface 11 or data outputted from an analog circuit portion 13. At that time, as needed, the digital circuit portion 12 writes data in a memory 14 or reads out written data. The analog circuit portion 13 processes analog data to the antenna 3 and analog data from the antenna 3.

The host computer 1 outputs a command as a digital signal to the data conversion device 2. The interface 11 of the data conversion device 2 outputs the digital signal inputted from the host computer 1 to the digital circuit portion 12. The digital circuit portion 12 analyzes the command included in the inputted digital signal, and on the basis of the analysis result, the command to be transmitted to the IC card 4 is determined. The determined command is subjected to processing such as encrypting or conversion of a code system, and is outputted to the analog circuit portion 13. The analog circuit portion 13 converts data of the command of the inputted digital signal into an analog signal, and outputs it to the antenna 3 (FIG. 1).

The antenna 3 electromagnetically emits the command of the inputted analog signal to the IC card 4 by wireless. The emitted command is received by the IC card 4. The IC card 4 analyzes the received command by an internal IC (not shown), and returns a response corresponding to the analysis result as an analog signal to the antenna 3.

The antenna 3 having received the response transmitted from the IC card 4 by wireless transmits the received response with an analog signal to the data conversion device 2. The data conversion device 2 analyzes the response transmitted from the antenna 3, and outputs the analysis result as a digital signal to the host computer 1.

Like this, since the data conversion device 2 and the antenna 3 are used in one-to-one combination, in the case where a plurality of gates are installed, such as a ticket gate of public transport, plural pairs of data conversion devices 2 and antennas 3 are used. FIG. 4 is a view schematically showing a case where a plurality of gates are provided. A data conversion device 2-1 and an antenna 3-1 are installed for a gate 21-1, a data conversion device 2-2 and an antenna 3-2 are installed for a gate 21-2, a data conversion device 2-3 and an antenna 3-3 are installed for a gate 21-3, and a data conversion device 2-N and an antenna 3-N are installed for a gate 21-N (hereinafter, in a case where it is not necessary to distinguish the respective antennas 3-1 to 3-N, they are respectively represented merely as the antenna 3. The other devices are also represented in the same way.) Like this, a pair of data conversion device 2 and antenna 3 are respectively installed for the respective gates 21.

IC cards 4-1 to 4-N are designed so that they are recognized even if they pass through any of the gates 21-1 to 21-N.

In the case where the data conversion devices 2-1 to 2-N are installed in this way, it is necessary to install a control portion 22 between the data conversion devices 2-1 to 2-N and the host computer 1. The control portion 22 makes control to determine that data outputted from the host computer 1 is transmitted to which data conversion device 2, or to determine which data conversion device 2 transmits data, or detects the data conversion device 2 being out of order.

As described above, in the case where the plurality of data conversion devices 2 are installed, it has been necessary to install the control portion 22 for controlling those data conversion devices 2. However, the design of the control portion 22 has required considerable labor, and in the case where the system is changed, it has been necessary to newly design. Besides, since communication between the data conversion devices 2 and the antenna 3 is performed through an analog signal, there has been a problem that if the distance is made long, the signal is attenuated.

SUMMARY OF THE INVENTION

The present invention has been made in view of such circumstances to simplify a structure of a system by causing an antenna to be equipped with a circuit for processing data.

According to a principal aspect of the invention, an information processing apparatus comprises output means for outputting a command to a plurality of devices, input means for inputting a response to the command, outputted from the plurality of devices, and identification means for discriminating the plurality of devices.

The output means can be made to output the same data to the plurality of devices.

The output means can be made to output the command to the plurality of devices by using wireless communication.

The information processing apparatus further comprises table storage means for storing a table of intrinsic IDs respectively given to each of the plurality of devices, and the identification means can be made to perform identification by using the table of the IDs.

The information processing apparatus comprises ports corresponding to the plurality of devices, and the identification means identifies the ports to identify the plurality of devices.

The identification means sequentially outputs the command outputted by the output means to the plurality of devices in a time-sharing manner, so that the plurality of devices can be identified.

According to another aspect of the invention, an information processing method comprises an output step of outputting a command to a plurality of devices, an input step of inputting a response to the command, outputted from the plurality of devices, and an identification step of discriminating the plurality of devices.

According to a further aspect of the invention, a program of a medium causes an information processing apparatus to execute an output step of outputting a command to a plurality of devices, an input step of inputting a response to the command, outputted from the plurality of devices, and an identification step of discriminating the plurality of devices.

According to yet another aspect of the invention, an information processing apparatus comprises input means for inputting a command, analysis means for analyzing the command inputted by the input means, transmission means for transmitting a signal corresponding to an analysis result of the analysis means to another device, reception means for receiving a response to the signal from the other device, and output means for outputting a signal corresponding to the response received by the reception means to a device having outputted the command.

The input means and the output means can be made to cause operation by using first wireless communication, and the transmission means and the reception means can be made to cause operation by using second wireless communication.

The information processing apparatus further comprises ID storage means for storing an intrinsic ID.

According to a yet further aspect of the invention, an information processing method comprises an input step of inputting a command, an analysis step of analyzing the command inputted at the input step, a transmission step of transmitting a signal corresponding to an analysis result at the analysis step to another device, a reception step of receiving a response to the signal from the other device, and an output step of outputting a signal corresponding to the response received at the reception step to a device having outputted the command.

According to another aspect of the invention, a program of a medium causes an information processing apparatus to execute an input step of inputting a command, an analysis step of analyzing the command inputted at the input step, a transmission step of transmitting a signal corresponding to an analysis result at the analysis step to another device, a reception step of receiving a response to the signal from the other device, and an output step of outputting a signal corresponding to the response received at the reception step to a device having outputted the command.

According to a further aspect of the invention, a control device of an information processing system comprises output means for outputting a command, and identification means for discriminating a plurality of analysis devices, the analysis device comprises analysis means for analyzing the command outputted by the output means, transmission means for transmitting a signal corresponding to an analysis result of the analysis means to an information storage device, reception means for receiving a response corresponding to the signal from information storage device, and transfer means for transferring a signal corresponding to the response received by the reception means to the control device, and the information storage device comprises storage means for storing predetermined information, and response transmission means for receiving the signal transmitted by the transmission means and corresponding to the analysis result, reading out information corresponding to the signal from the storage means, and transmitting it as the response to the analysis device.

The information storage device is of a portable card type, and can be made to perform transfer of data to the analysis device by wireless.

Electric power of the analysis device can be made to be supplied from the control device.

The control device and the analysis device can be made to preform transfer of data by wireless.

According to yet another aspect of the invention, an information processing method of a control device of an information processing system comprises an output step of outputting a command, and an identification step of discriminating a plurality of analysis devices, an information processing method of the analysis device comprises an analysis step of analyzing the command outputted at the output step, a transmission step of transmitting a signal corresponding to an analysis result at the analysis step to an information storage device, a reception step of receiving a response corresponding to the signal from information storage device, and a transfer step of transferring a signal corresponding to the response received at the reception step to the control device, and an information processing method of the information storage device comprises a storage step of storing predetermined information, and a response transmission step of receiving the signal transmitted at the transmission step and corresponding to the analysis result, reading out information corresponding to the signal from the storage step, and transmitting it as the response to the analysis device.

According to a yet further aspect of the invention, a medium causes a control device to execute a program comprising an output step of outputting a command, and an identification step of discriminating a plurality of analysis devices, causes the analysis device to execute a program comprising an analysis step of analyzing the command outputted at the output step, a transmission step of transmitting a signal corresponding to an analysis result at the analysis step to an information storage device, a reception step of receiving a response corresponding to the signal from information storage device, and a transfer step of transferring a signal corresponding to the response received at the reception step to the control device, and causes the information storage device to execute a program comprising a storage step of storing predetermined information, and a response transmission step of receiving the signal transmitted at the transmission step and corresponding to the analysis result, reading out information corresponding to the signal from the storage step, and transmitting it as the response to the analysis device.

In the information processing apparatus, the information processing method, and the medium of the invention, the command is outputted to the plurality of devices, the response to the command, outputted from the plurality of devices, is inputted, and the plurality of devices are identified.

In the information processing apparatus, the information processing method, and the medium of the invention, the inputted command is analyzed, the signal corresponding to the analysis result is transmitted to the other device, the response to the transmitted signal is received from the other device, and the signal corresponding to the received response is outputted to the device having outputted the command.

In the control apparatus of the information processing system, the information processing method, and the medium of the invention, the control device outputs the command and identifies the plurality of analysis devices, the analysis device analyzes the command, transmits the signal corresponding to the analysis result to the information storage device, receives the response to the signal from the information storage device, and transfers the signal corresponding to the received response to the control device, and the information storage device stores the predetermined information, receives the signal corresponding to the transmitted analysis result, reads out the information corresponding to the signal, and transmits it as the response to the analysis device.

Additional features and advantages of the present invention are described in, and will be apparent from, the following Detailed Description of the Invention and the figures.

DETAILED DESCRIPTION

Figure 5:
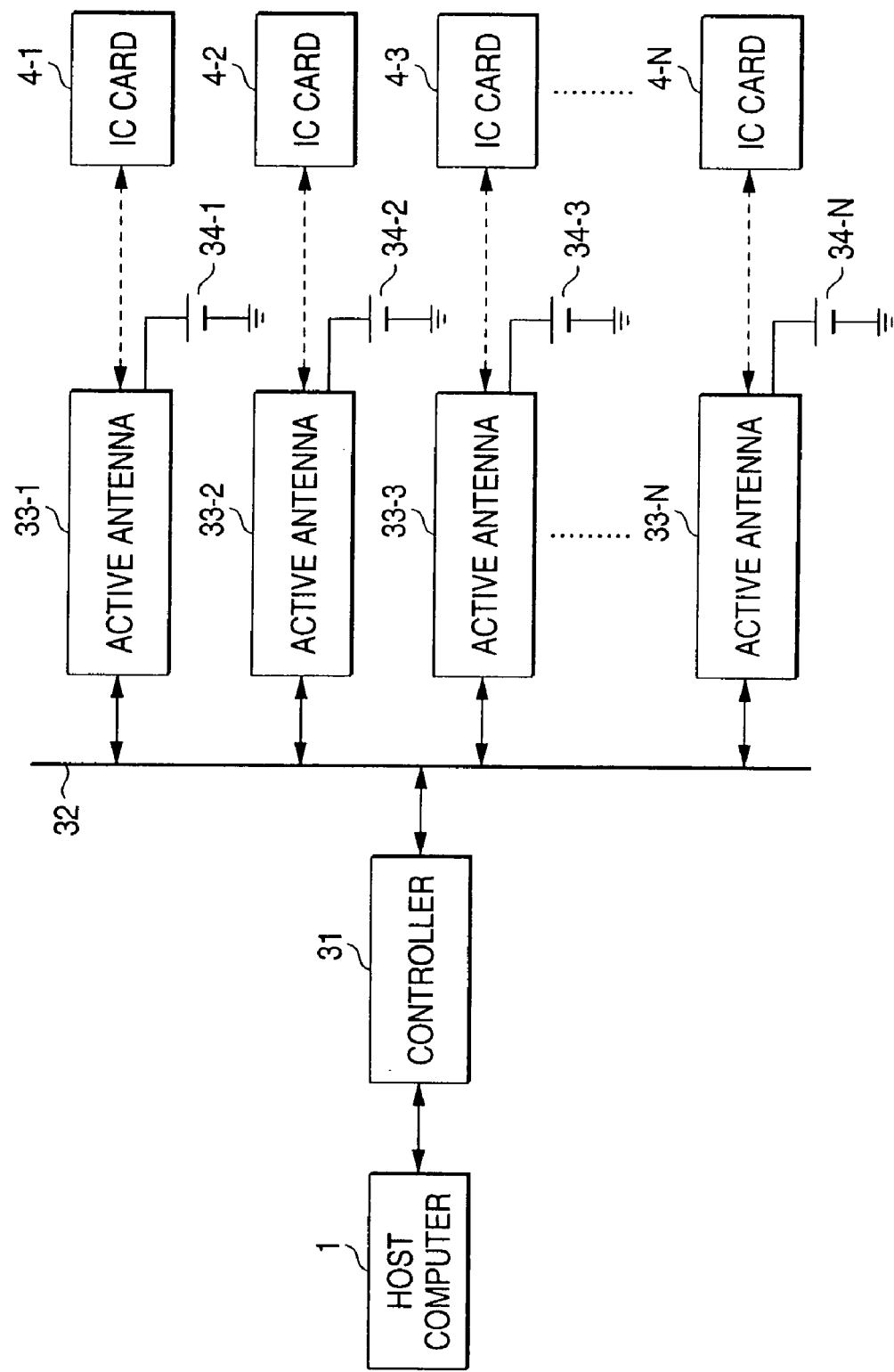
FIG. 5 is a view showing a structure of an IC card system to which the invention is applied.

FIG. 5 is a view showing a structure of an embodiment of an IC card system to which the present invention is applied. A command outputted from a host computer 1 is inputted to a controller 31. The controller 31 outputs the inputted command through a bus 32 to active antennas 33-1 to 33-N. The active antennas 33-1 to 33-N transmit respectively the inputted command to corresponding IC cards 4-1 to 4-N by wireless. The active antennas 33-1 to 33-N are respectively equipped with power supplies 34-1 to 34-N, and electric power is supplied from those power supplies 34.

Figure 6:
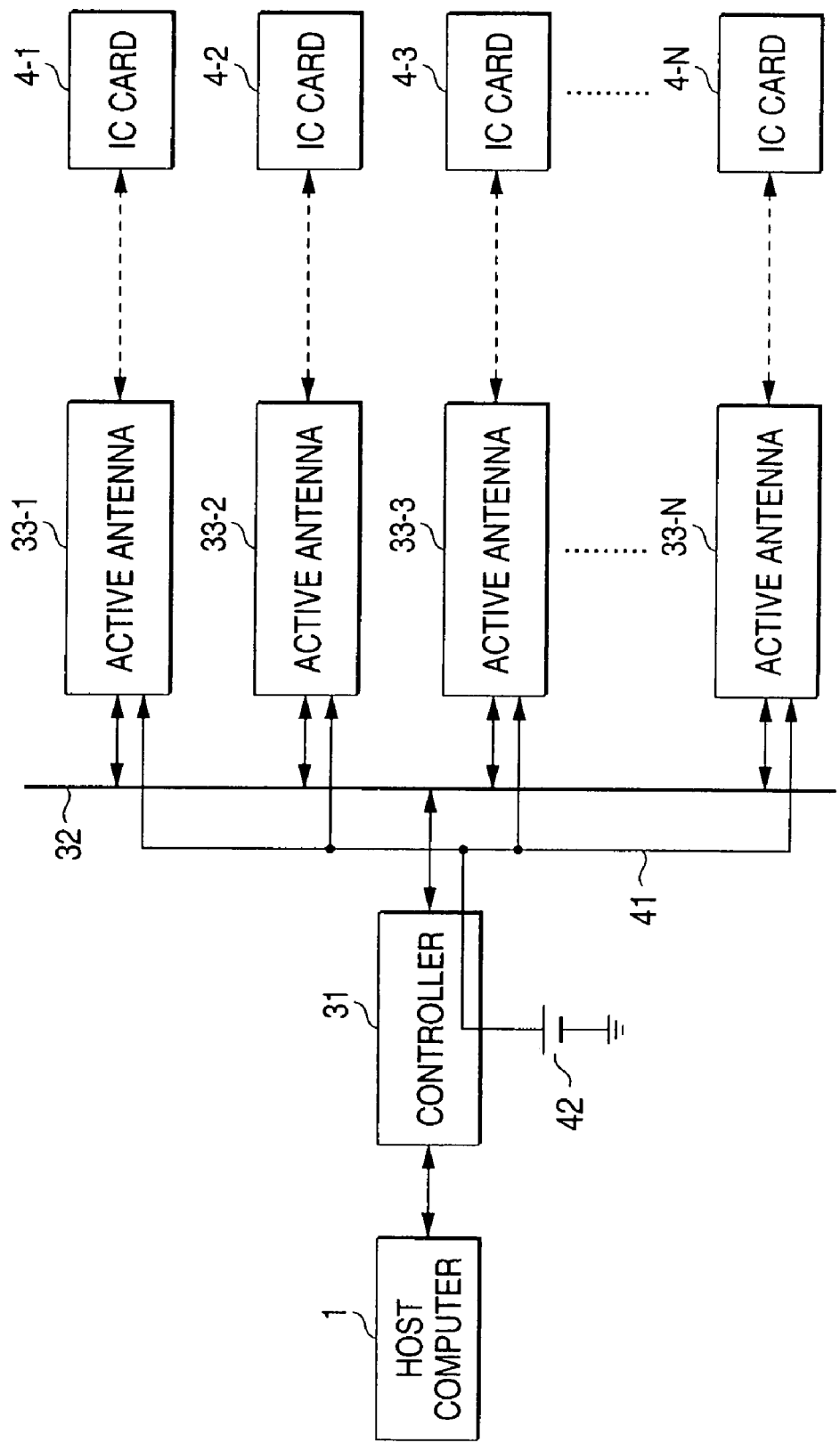
FIG. 6 is a view for explaining the way of connection of another power supply.

As shown in FIG. 6, a power supply line 41 for supplying electric power is provided, and the electric power may be supplied from a power supply 42 connected to the controller 31.

By doing so, when the system is changed, for example, the active antennas 33 are increased, the increase can be easily made.

The IC cards 4-1 to 4-N may be made to be able to transfer data to any active antenna 33, or transfer of data may be made between only a predetermined IC card 4 and active antenna 33.

Figure 7:
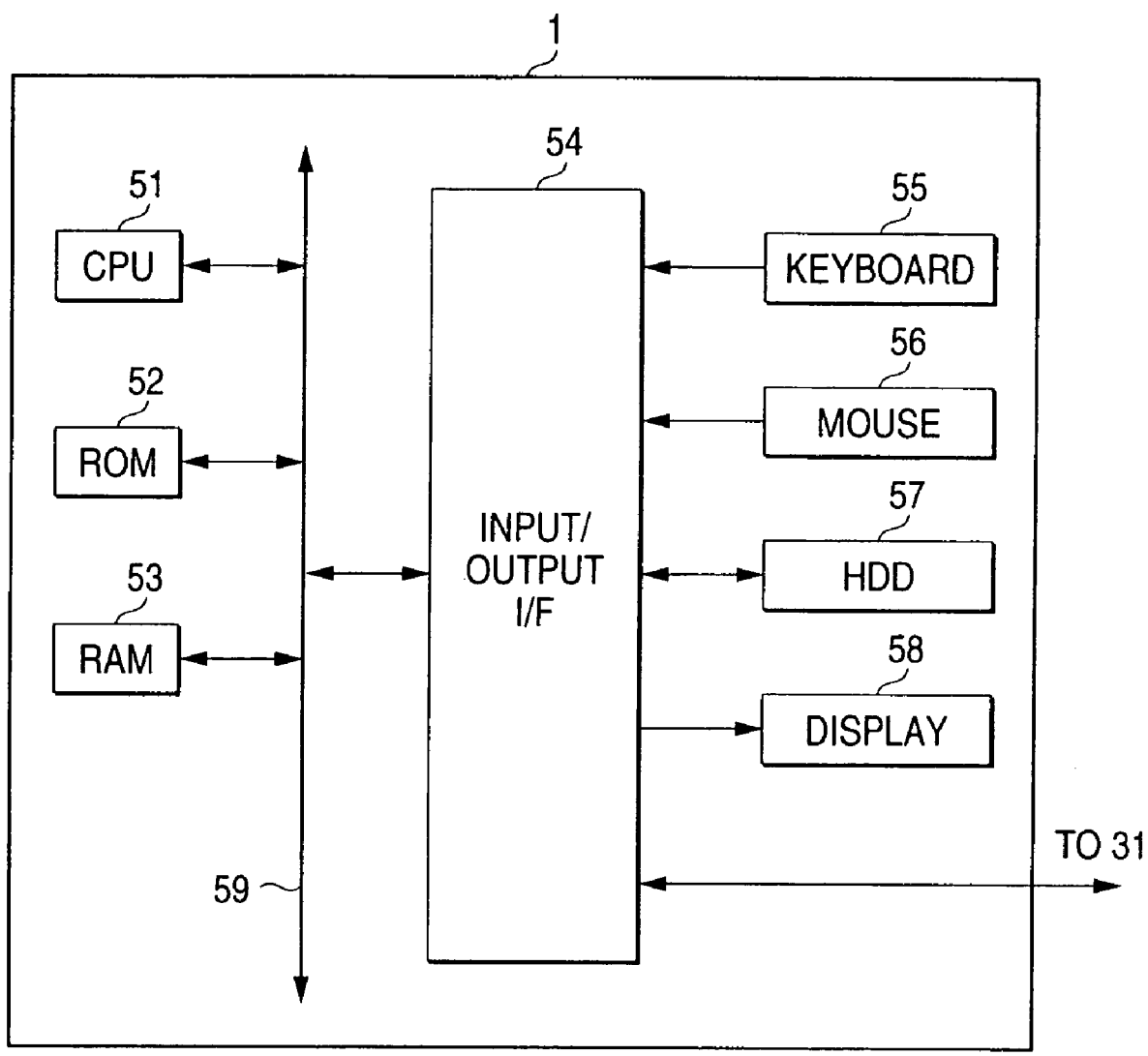
FIG. 7 is a view showing an internal structure of the host computer 1.

FIG. 7 is a block diagram showing an internal structure of the host computer 1. A CPU 51 of the host computer 1 executes various processings in accordance with programs stored in a ROM (Read Only Memory) 52. In a RAM (Random Access Memory) 53, data or programs necessary for the CPU 51 to execute various processings are suitably stored. An input/output interface (I/F) 54 is connected with a keyboard 55 and a mouse 56, and outputs a signal inputted from those to the CPU 51. Besides, the input/output I/F 54 is connected with a hard disk (HDD) 57, and data, programs and the like can be recorded there or reproduced. The input/output I/F 54 is also connected with a display 58 as a display device, and is further connected with a controller 31 (FIG. 6) as well. An internal bus 59 connects these portions mutually.

Figure 8:
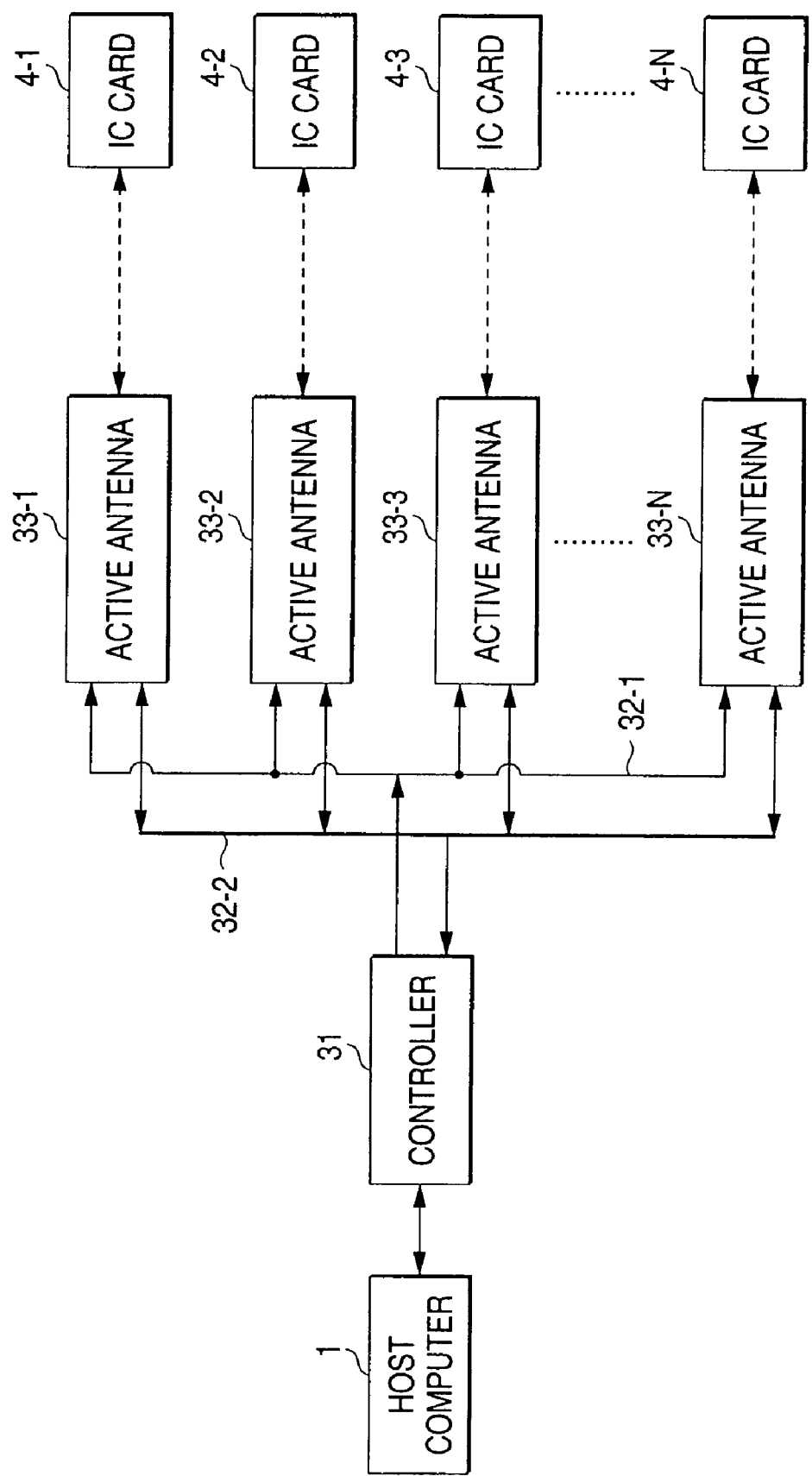
FIG. 8 is a view for explaining the connection of a bus.

When the controller 31 is made a controller used for a bus type system (network) in which the same data are transmitted to all the active antennas 33-1 to 33-N connected to the bus 32, the IC card system becomes a structure in which a bus 32-1 for transmission and a bus 32-2 for reception are provided as the bus 32 as shown in FIG. 8. Incidentally, the electric power is supplied as shown in FIG. 5 or FIG. 6, and in FIG. 8 and the following, its description is suitably omitted. Here, although the bus 32-1 for transmission and the bus 32-2 for reception are separately provided, one bus may be used in common.

Although the details will be described later, the controller 31 corresponding to the bus type network outputs a command inputted from the host computer 1 to all the active antennas 33-1 to 33-N through the bus 32-1 for transmission. The respective active antennas 33 output a response corresponding to the inputted command to the controller 31 through the bus 33-2 for reception. Here, the controller 31 is made a controller corresponding to the bus type network.

Figure 9:
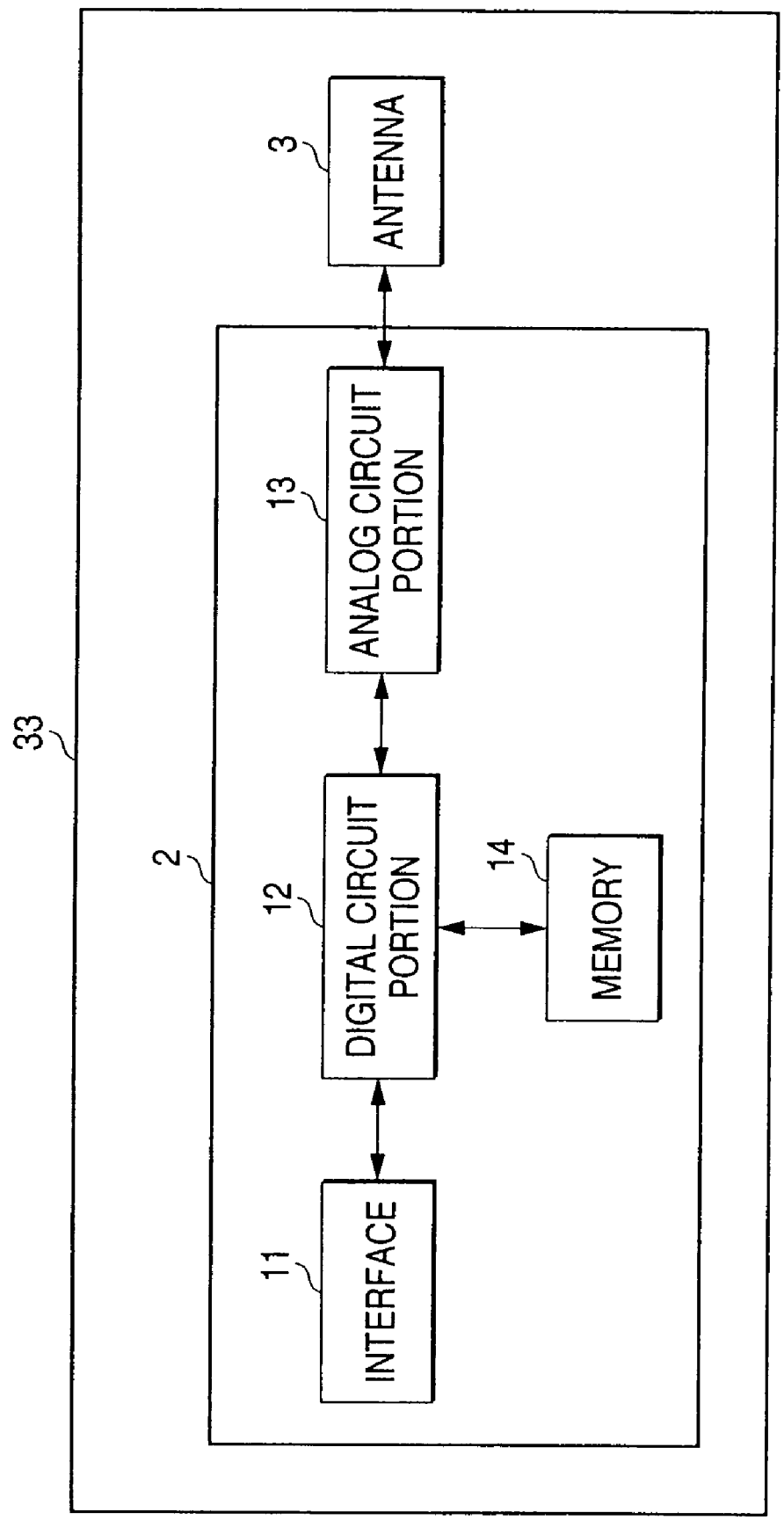
FIG. 9 is a view showing an internal structure of an active antenna 33.

FIG. 9 is a block diagram showing an internal structure of the active antenna 33. The active antenna 33 is constituted by the data conversion device 2 and the antenna 3. Since the data conversion device 2 and the antenna 3 have been already described, the description is omitted. Like this, by making the structure where the data conversion device 2 and the antenna 3 are integrated, for example, when the structure of the IC card system is changed, the change can be easily made. Besides, since transfer of data is performed with a digital signal between the controller 31 and the active antenna 33, attenuation of the signal is low, and it becomes possible to lengthen the distance of the bus 32-1 for transmission and the bus 32-2 for reception (hereinafter, the bus 32-1 for transmission and the bus 32-2 for reception are made one bus, and are abbreviated to the bus 32 as shown in FIG. 5 or FIG. 6).

Figure 10:
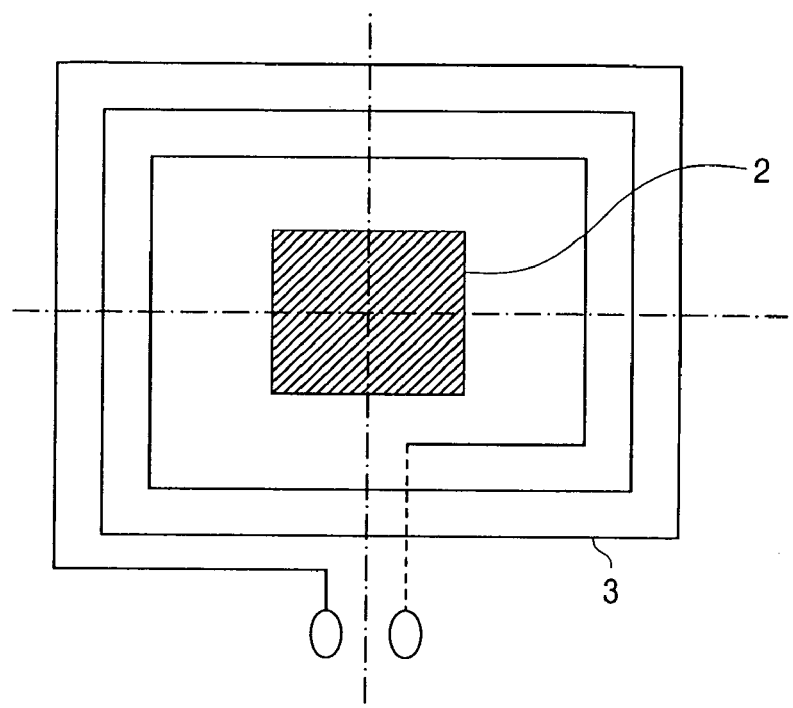
FIG. 10 is a view for explaining the installation of the data conversion device 2 and the antenna 3.
Figure 11:
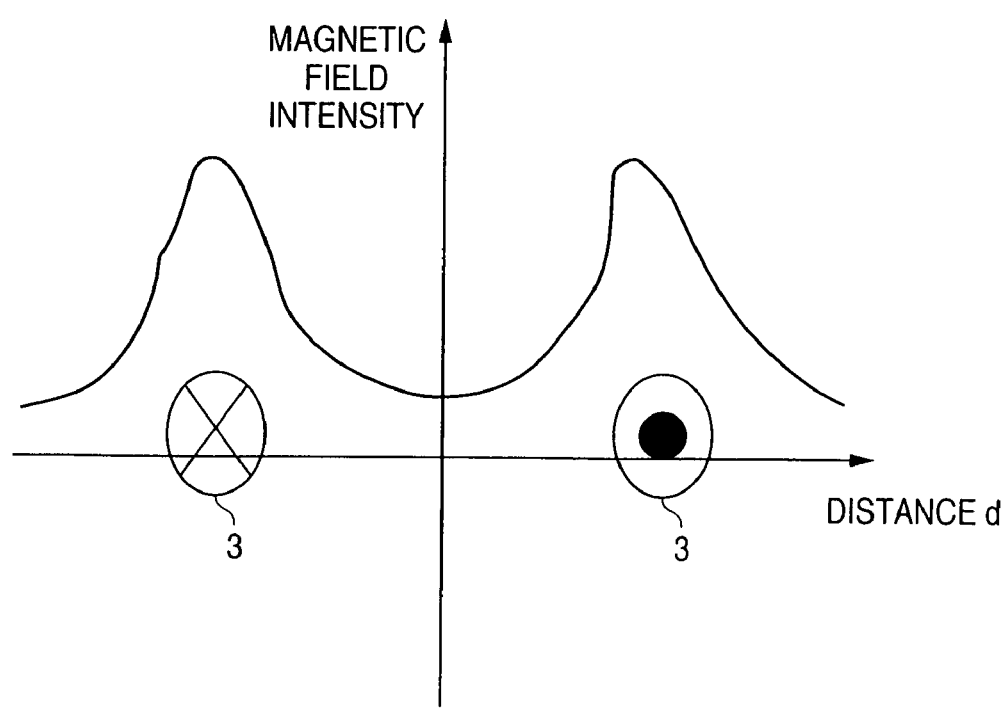
FIG. 11 is a view for explaining the magnetic field intensity of the antenna 3 shown in FIG. 10.

However, when the antenna 3 and the analog circuit portion 13 are integrated, it is conceivable that an electromagnetic wave generated by one of them influences the other. Thus, it is conceivable that there occurs such a disadvantage that the distance between the antenna 3 and the IC card 4 in which wireless communication is possible, becomes short. Thus, in the case where a loop coil antenna is used as the antenna 3, as shown in FIG. 10, the data conversion device 2 including the analog circuit portion 13 is installed so as to be positioned at the center portion of the loop coil antenna. Since the magnetic field intensity at the center portion of the loop coil antenna is weaker than that at the vicinity of the coil as shown in FIG. 11, it becomes possible to reduce the interaction between the antenna 3 and the analog circuit portion 13. Besides, by constructing a mounting portion of the data conversion device 2 to be small, it becomes possible to further suppress the interaction with the antenna 3.

The respective active antennas 33 hold an intrinsic ID (store, for example, in the memory 14), and are designed so that it is possible to distinguish the active antennas 33 by the ID. For example, the ID of the active antenna 33-1 is 01 the ID of the active antenna 33-2 is 02, the ID of the active antenna 33-3 is 03,' and the ID of the active antenna 33-N is N. Like this, the intrinsic ID given to the respective active antennas 33 is stored. For example, when 8 bits are used for the ID, it is possible to identify 256 active antennas 33. For the ID, the respective active antennas 33 may use a fixedly set one, or the controller 31 gives the IDs to the connected active antennas 33, and the respective active antennas 33 may store the given ID.

Figure 12:
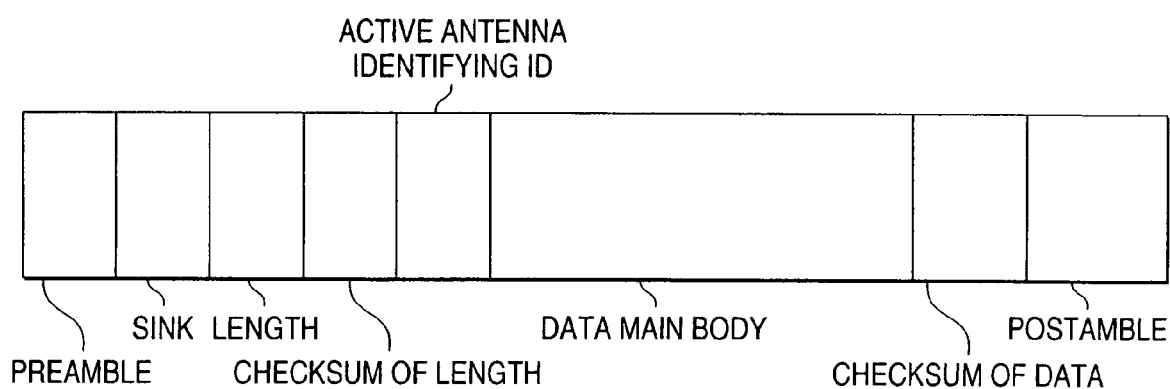
FIG. 12 is a view for explaining a data structure of data transferred between the host computer 1 and a controller 31.

In the IC card system including such active antennas 33, a data structure of data outputted from the host computer 1 to the active antenna 33 through the controller 31 is shown in FIG. 12. The structure shown in FIG. 12 is made a structure in which data relating to an ID given to identify the active antenna 33, called an active antenna discriminating ID, are added to the data structure shown in FIG. 2. When the host computer 1 outputs a command to the controller 31, it outputs also the ID of the active antenna 33 to which the command is to be outputted. The controller 31 collectively transmits the data having the data structure shown in FIG. 12 and including the command inputted from the host computer 1 to the active antennas 33-1 to 33-N through the bus 32-1 for transmission.

The respective active antennas 33-1 to 33-N examine the active antenna discriminating ID contained in the received data, compare the ID of the analysis result with the ID stored in the memory 14 (FIG. 9), and judge whether or not they are the same. In the case where the digital circuit portion 12 of the active antenna 33 judges that the received ID is not identical to the ID stored in the memory 14, it destroys the received data, and in the case where it judges that they are the same, it performs processing corresponding to the command contained in the received data, and outputs the processing result to the analog circuit portion 13. The analog circuit portion 13 converts a digital signal into an analog signal and outputs it to the antenna 3.

The IC card 4 having received the command outputted from the antenna 3 returns a response corresponding to the command to the antenna 3. The response received by the antenna 3 is converted into data having a data structure as shown in FIG. 12 by the data conversion device 2, and is inputted to the controller 31. The active antenna discriminating ID of the data inputted to the controller 31 is the ID of the active antenna 33 of the transmission origin.

Like this, the same data are transmitted to the active antennas 33-1 to 33-N connected to the controller 31, the respective active antennas 33 having received the data judge whether or not the data are directed to itself, and only the active antenna 33 which judged that they are directed to itself executes processing.

Figure 13:
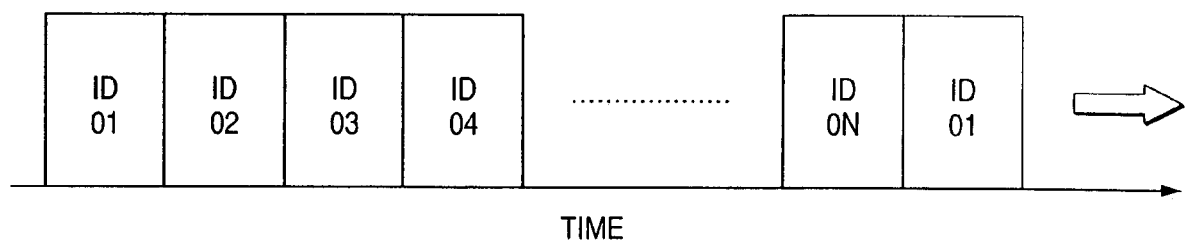
FIG. 13 is a view for explaining a case where data are transmitted in a time-sharing manner.

Although the host computer 1 may specify an ID of a desired active antenna 33, when necessary, to transmit a command, as shown in FIG. 13, a command may be transmitted by sequentially changing the active antenna discriminating ID in a time-sharing manner. In the case where it is desired to transmit the same command to all the active antennas 33, it is possible to materialize by previously setting an ID indicating that.

Figure 14:
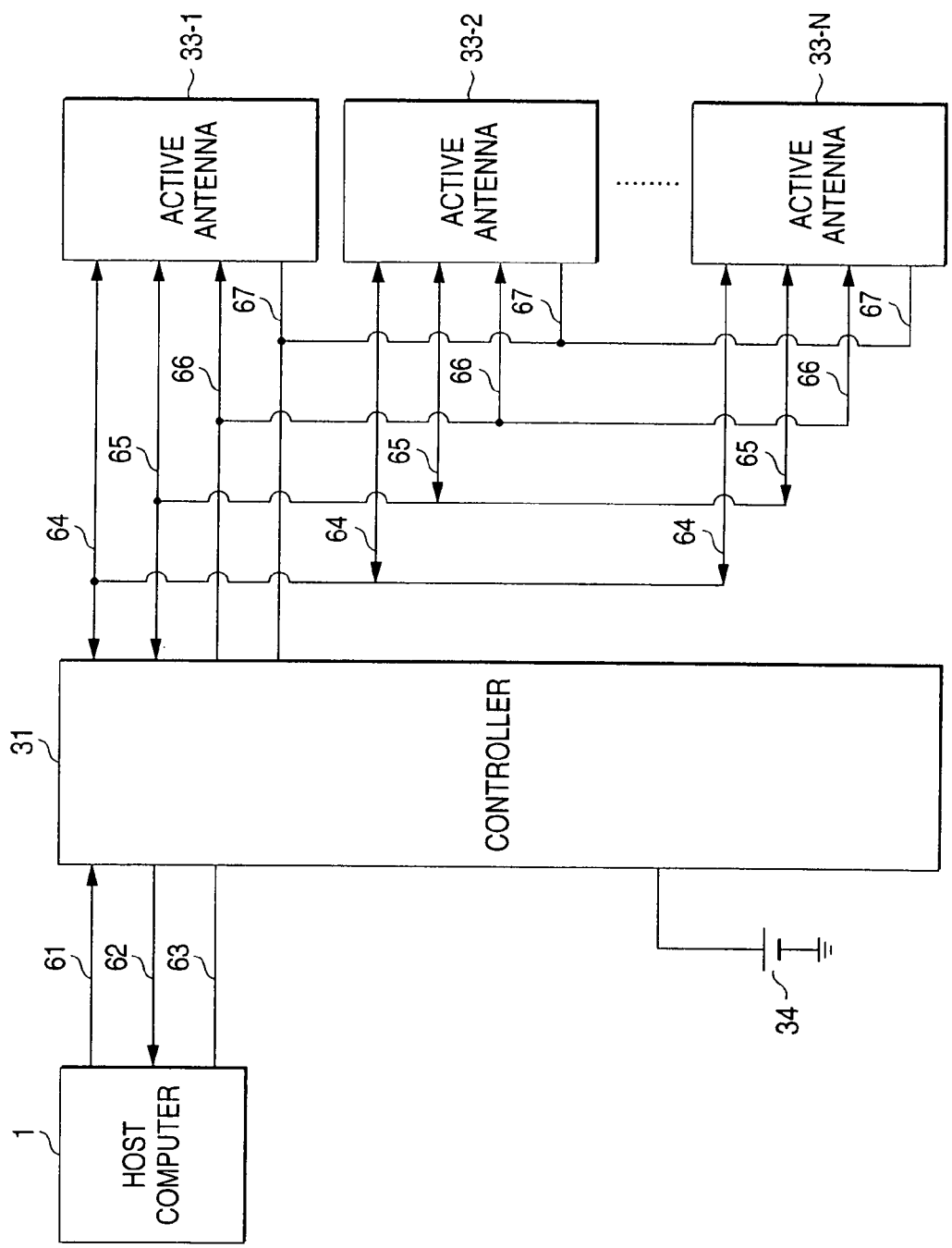
FIG. 14 is a view for explaining the connection relation in a case where a cable of RS232C standard and a cable of RS485 standard are used.

Next, a description will be concretely made on a case where connection between the host computer 1 and the controller 31 is made by use of a cable based on an RS232C standard, and connection between the controller 31 and the respective active antennas 33 is made by use of a cable based on an RS485 standard. As shown in FIG. 14, when the host computer 1 is connected to the controller 31 through the cable of the RS232C standard, a command bus 61 for command transmission, a response bus 62 for response, and a ground 63 are respectively provided.

When the controller 31 is connected to the active antenna 33 through the cable based on the RS485 standard, since data are transmitted with a differential signal, a bus plus 64 for transmitting the plus side of the differential signal and a bus minus 65 for transmitting the minus side are provided. Power for operating the active antenna 33 is also supplied from the controller 31 by providing a power supply line 66. Further, a ground 67 is provided. The bus plus 64 and the bus minus 65 are jointly used for transmission of a command from the controller 31 to the active antenna 33 and for transmission of a response from the active antenna 33 to the controller 31.

The bus plus 64, the bus minus 65, the power supply line 66, and the ground 67 branch off to the respective active antennas 33 so that they are jointly used (that is, they are made the bus-type structure) as shown in FIG. 14. Incidentally, when data is transmitted and received with a differential signal as in the cable of the RS485 standard, since it is possible to make it less influenced by an external noise, the distance between the controller 31 and the active antenna 33 can be lengthened.

Figure 15:
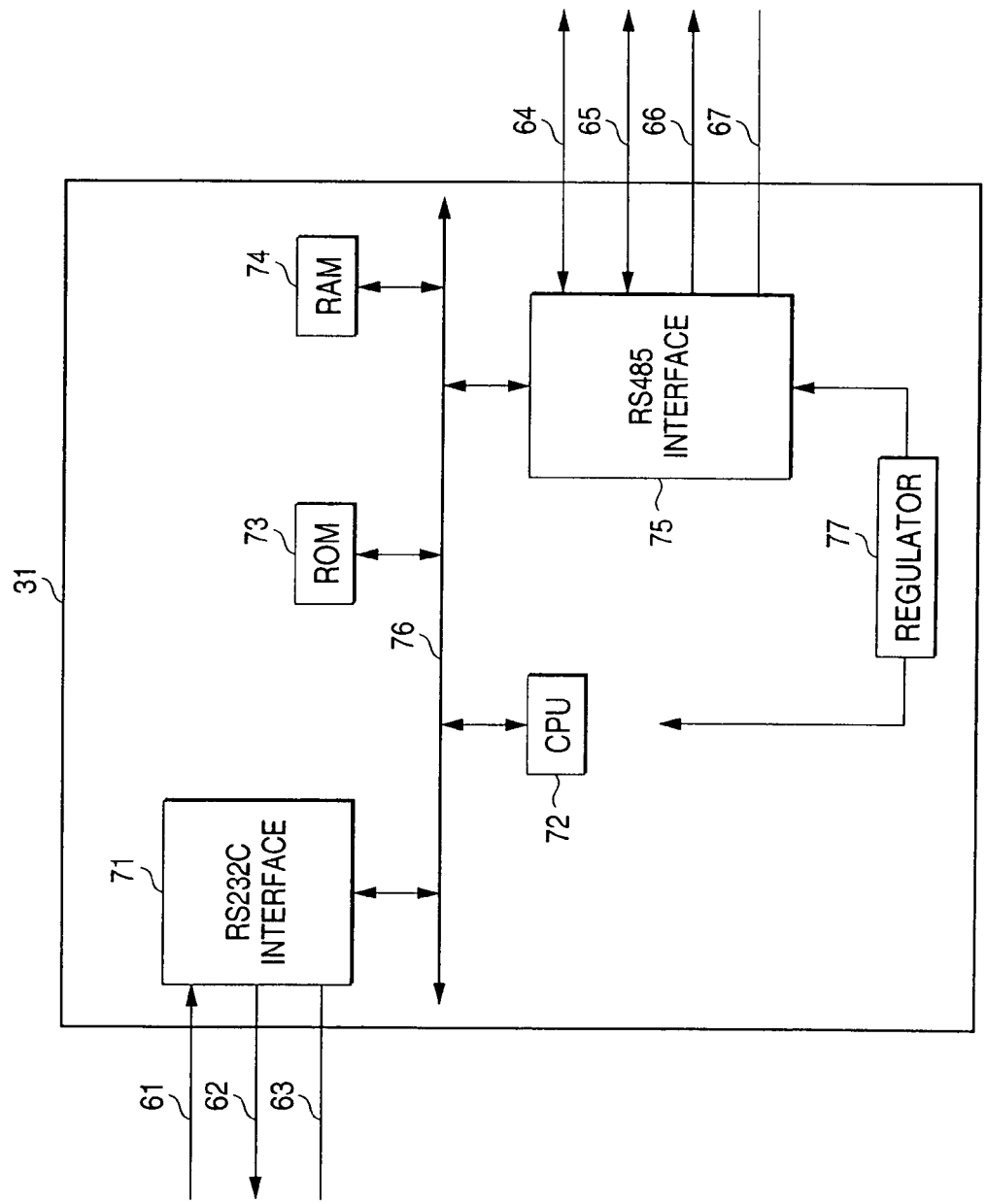
FIG. 15 is a view showing an internal structure of the controller 31 shown in FIG. 14.

FIG. 15 is a block diagram showing an internal structure of the controller 31 connected as shown in FIG. 14. An RS232C interface 71 interfaces a command transmitted from the host computer 1 through the cable of the RS232C standard. The interfaced command is analyzed by a CPU 72. The CPU 72 analyzes data in accordance with a program stored in a ROM 73. In a RAM 74, writing and reading of data are suitably performed by the CPU 72. The data analyzed by the CPU 72 is transmitted to the active antenna 33 from an RS485 interface 75 through two buses of the bus plus 64 and the bus minus 65.

Similarly, a response from the active antenna 33 is interfaced by the RS485 interface 75, is analyzed by the CPU 72, and is transmitted from the RS232C interface 71 through the response bus 62 to the host computer 1. The respective portions are mutually connected through an internal bus 76. A regulator 77 supplies electric power supplied from the power supply 34 to the respective portions of the controller 31, and also supplies it to the active antenna 33 through the power supply line 66.

Incidentally, secrecy is kept by using, as data transferred between the controller 31 and the active antenna 33, what is encrypted.

An internal structure of the active antenna 33 performing transfer of data to this controller 31 is realized by using an interface corresponding to the RS485 standard as the interface 11 of the active antenna 33 shown in FIG. 9.

Figure 16:
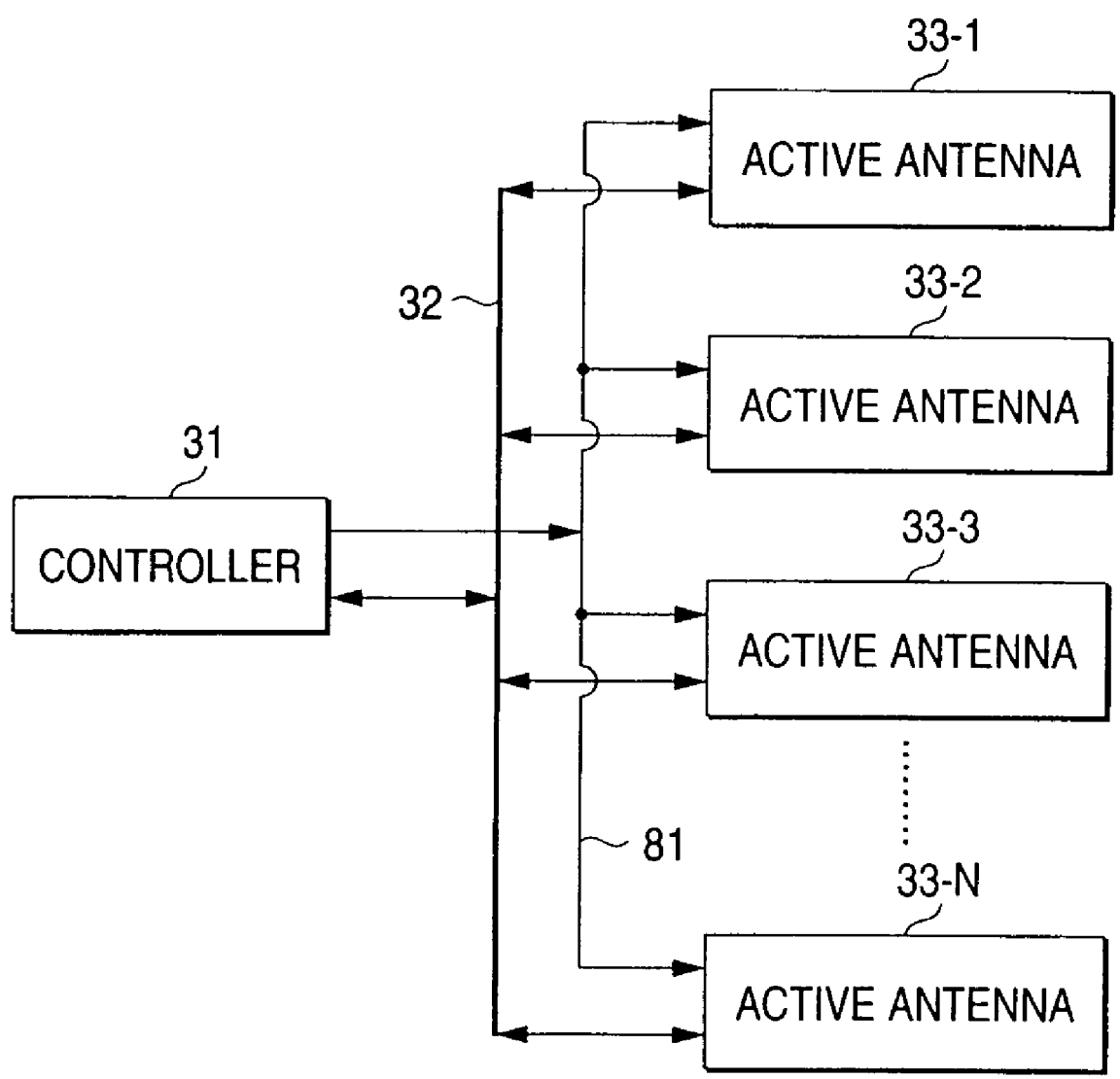
FIG. 16 is a view for explaining another way of connection between the controller 31 and the active antenna 33.

In the foregoing embodiment, although the description has been made on the case where the controller 31 transmits the same command to the connected active antennas 33, the command may be transmitted after the active antenna 33 to which transmission is made is selected. FIG. 16 is a view showing a structure of an IC card system in such a case. The controller 31 and the active antennas 33-1 to 33-N are connected to each other through the bus 32 for performing transfer of data, and are also connected to a communication permission line 81 for transmitting a signal to give permission of communication.

When the IC card system is made such a structure, it becomes unnecessary for the respective active antennas 33 to store an ID. That is, the controller 31 transmits communication permission through the communication permission line 81 to the active antenna 33 to which a command is to be transmitted. The active antenna 33 is operated only when the communication permission is obtained. Thus, although the command transmitted through the bus 32 is inputted to the active antenna 33 to which the communication permission is given, since the active antenna 33 to which the communication permission is not given does not function, it is impossible to input the command transmitted through the bus 32.

The communication permission may be given to the desired active antenna 33 by the host computer 1, or may be sequentially given to the active antenna 33-1 to the active antenna 33-N in a time-sharing manner When a response from the IC card 4 is obtained from the active antenna 33 put in operation by being given the permission, it is possible to specify which active antenna 33 among the active antennas 33-1 to 33-N returns the response. By making the time period of the time-sharing short, the controller 31 can be put in a state where it apparently performs communication with a plurality of active antennas 33.

Figure 1:
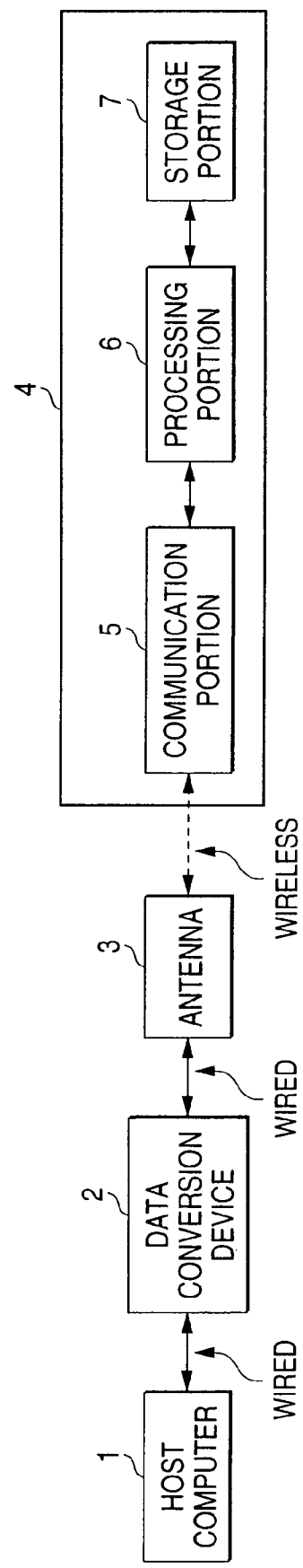
FIG. 1 is a view showing a structure of an IC card system.
Figure 2:
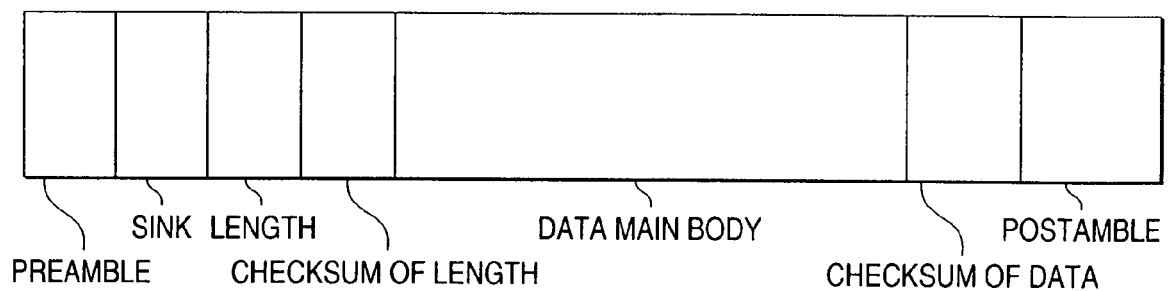
FIG. 2 is a view for explaining a data structure of data transferred between a host computer 1 and a data conversion device 2.
Figure 3:
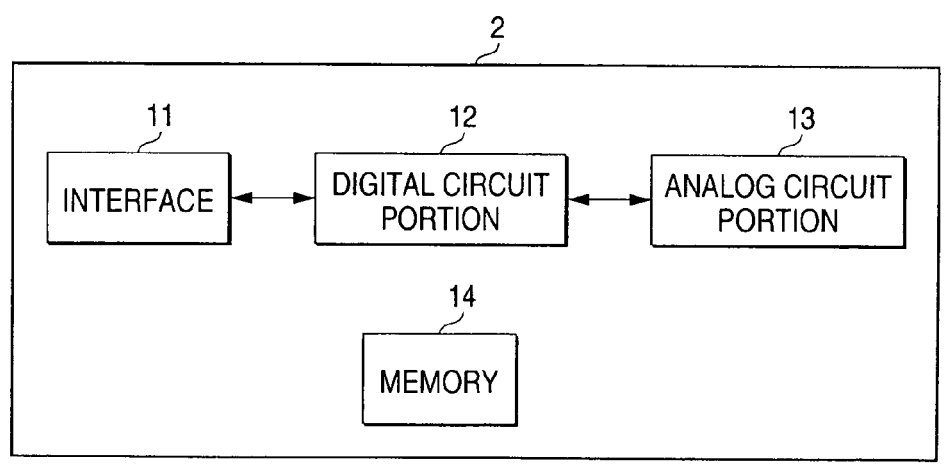
FIG. 3 is a view showing an internal structure of the data conversion device 2.
Figure 4:
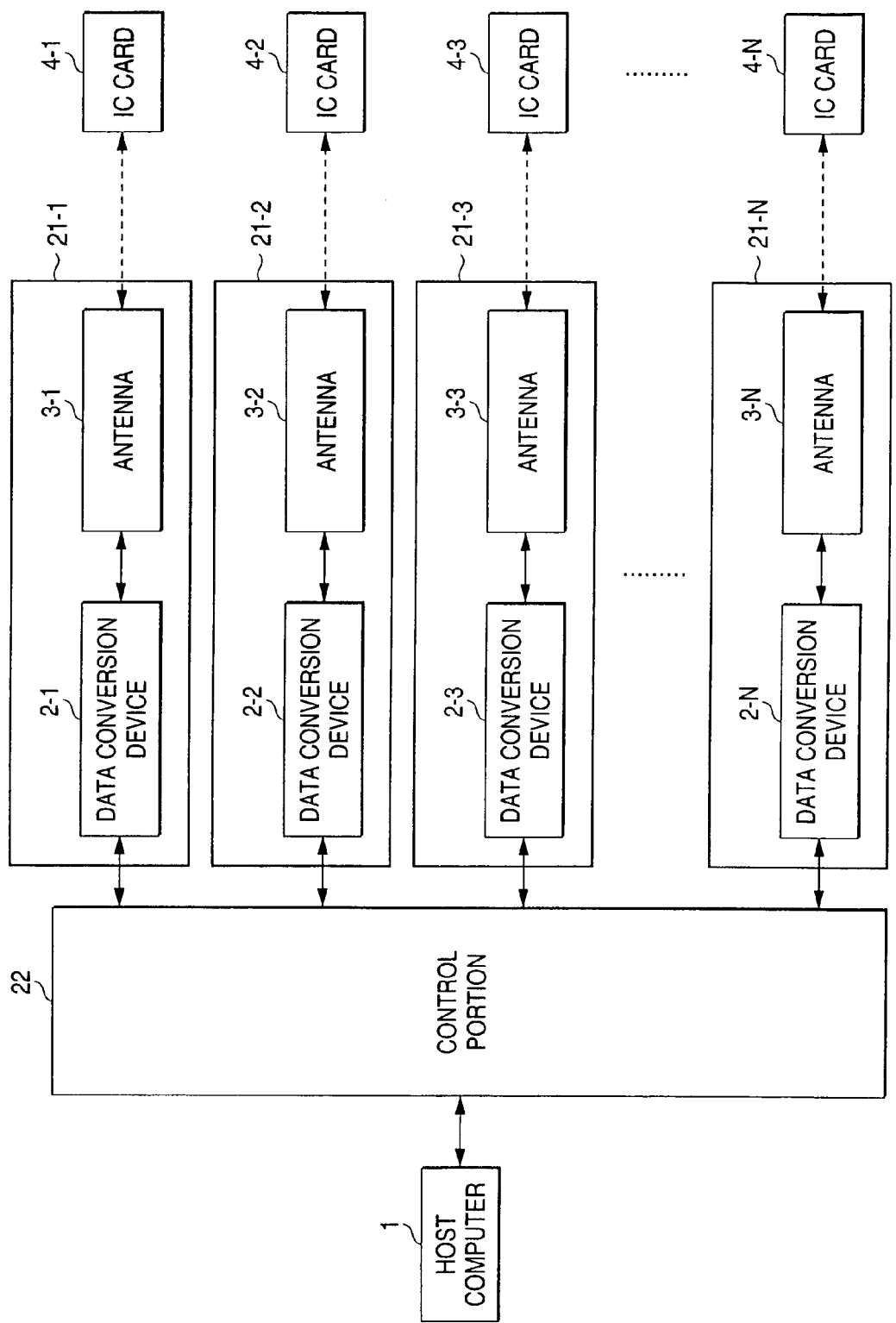
FIG. 4 is a view showing a structure of an IC card system in a case where a plurality of antennas are connected.

In the case where the structure as shown in FIG. 16 is made, since it is not necessary that data transferred between the controller 31 and the active antenna 33 is made to contain the active antenna discriminating ID (data structure shown in FIG. 12), the data is transferred in the data structure shown FIG. 2. However, data transferred between the host computer 1 and the controller 31 contains the active antenna discriminating ID (in this case, it becomes an ID for discriminating ports 91-1 to 91-N) as shown in FIG. 12.

Figure 17:
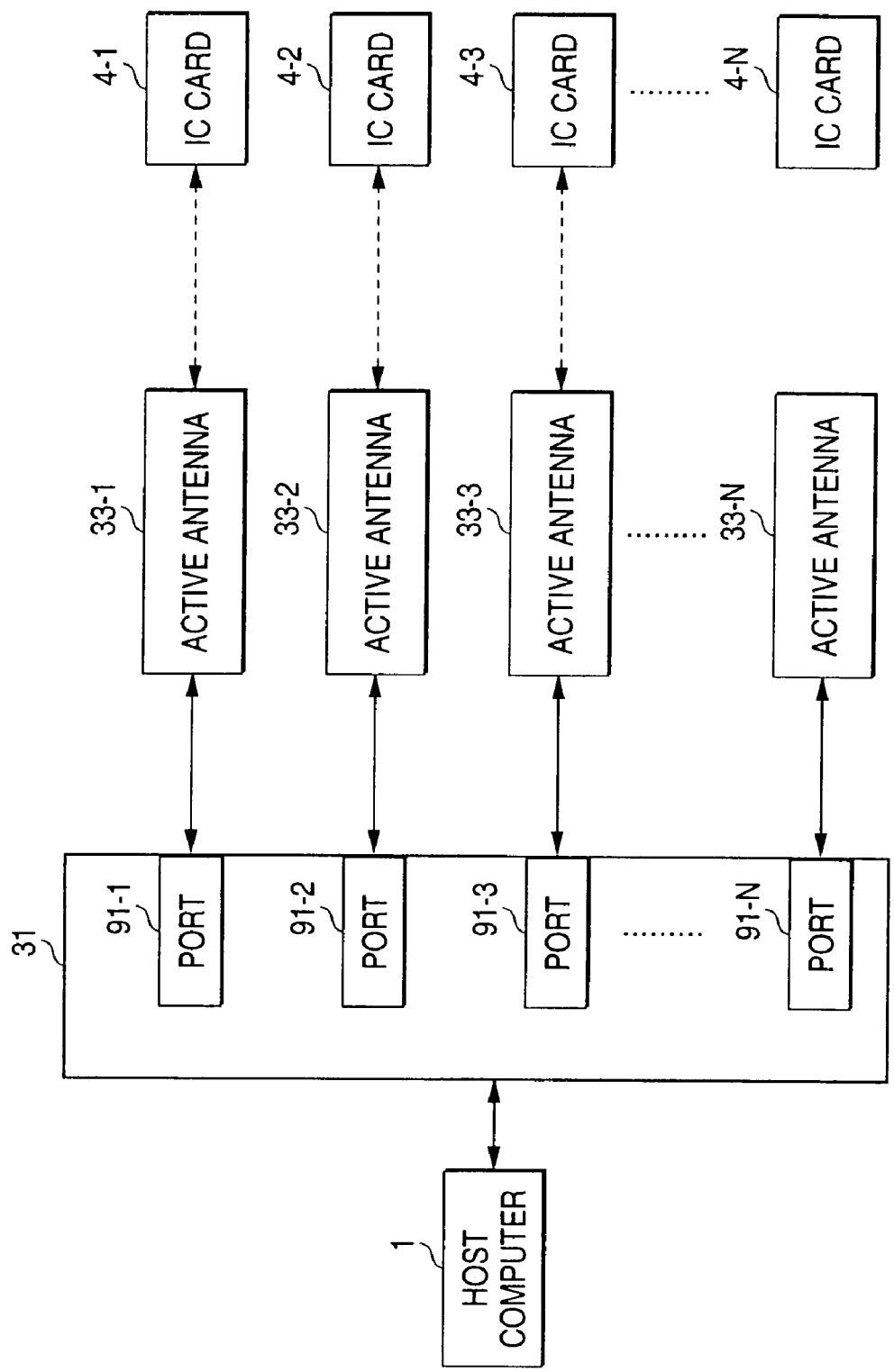
FIG. 17 is a view for explaining another structure of the controller 31.

In the foregoing embodiment, although the description has been made on the case where the controller 31 corresponds to the bus-type network, as shown in FIG. 17, ports 91-1 to 91-N connected to the active antennas 33-1 to 33-N may be provided in the controller 31. Like this, in the case where the controller 31 is made one in which star type connection can be made and the active antennas 33-1 to 33-N are connected through the start type network system, it is not necessary for the respective active antennas 33-1 to 33-N to store its own intrinsic ID. That is, the controller 31 is made to be able to identify the ports 91-1 to 91-N. The controller 31 transmits a command through the port 91 corresponding to the desired active antenna 33, and judges the port 91 having received a response returned from the active antenna 33, so that it judges which active antenna 33 transmitted the response.

Figure 18:
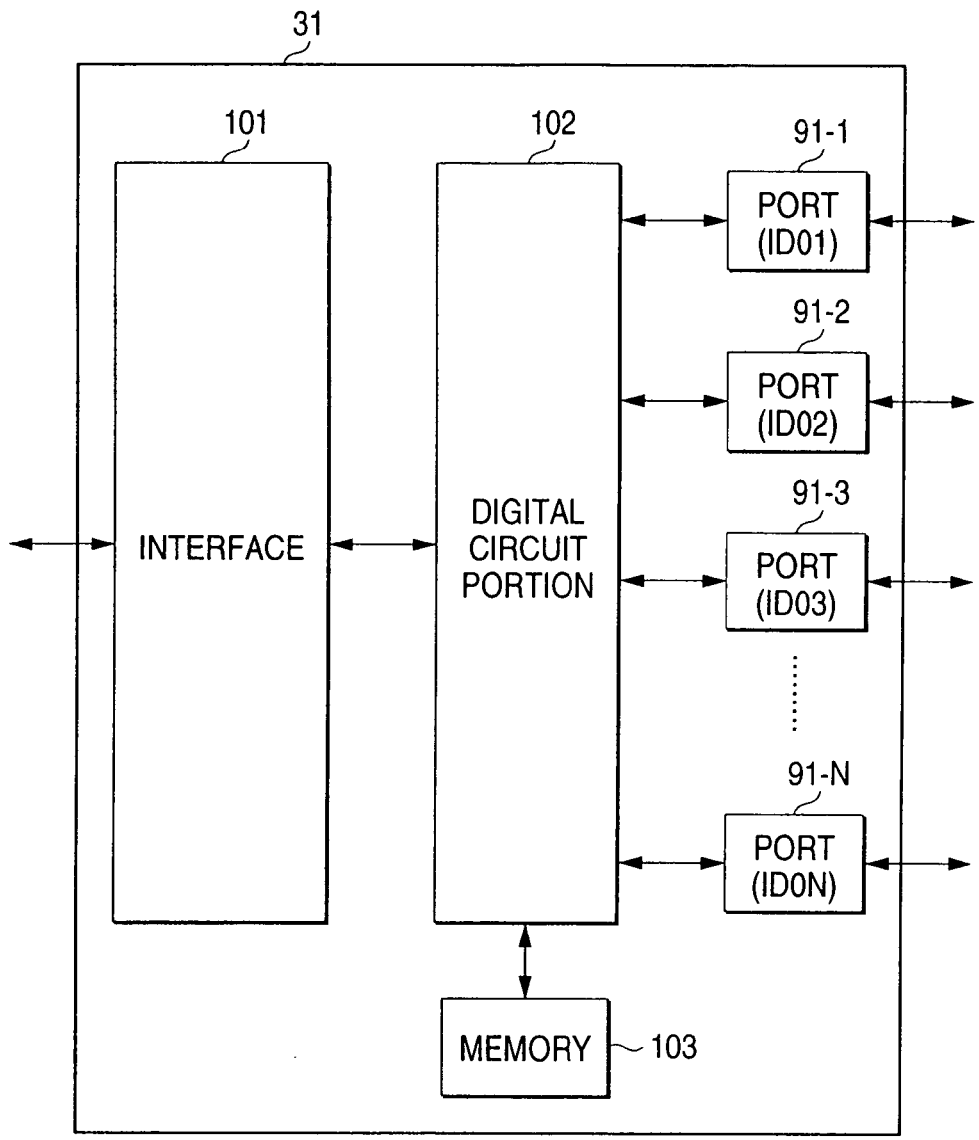
FIG. 18 is a view showing a detailed structure of the controller 31 of FIG. 17.

FIG. 18 shows an internal structure of the controller 31 in the case where such plurality of ports 91 are provided. An interface 101 interfaces data to the host computer 1. A digital circuit portion 102 performs processing such as identification (control) of the ports 91-1 to 91-N. A memory 103 stores data for identification of the ports 91 by the digital circuit portion 102, for example, in the case where an intrinsic ID is given to the respective ports 91, the ID.

Figure 19:
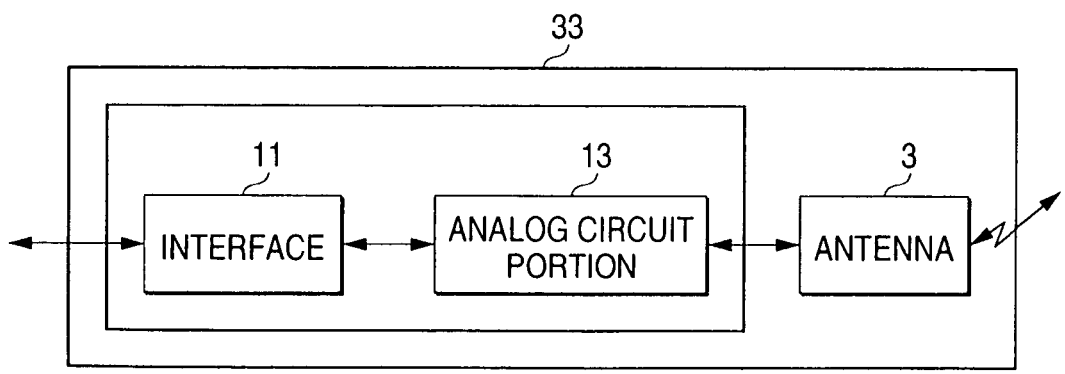
FIG. 19 is a view showing a structure of the active antenna 33 corresponding to the controller 31 of FIG. 18.

FIG. 19 shows an internal structure of the active antenna 33. As described above, in the case where the active antenna 33 is distinguished by the port 91 (in the case where the star type structure is made), it is not necessary for the active antenna 33 itself to store the intrinsic ID. This indicates that as compared with the structure of the active antenna 33 in the case of the bus type system structure, the circuit structure can be simplified.

That is, although the internal structure of the active antenna 33 in the case of the bus type system structure has been described with reference to FIG. 9, in the active antenna 33 shown in FIG. 9, the memory 14 for storing the ID and the digital circuit portion 12 for judging whether or not data is directed to itself by using the ID become unnecessary in the case of the active antenna 33 of the star type system structure as shown in FIG. 19.

Figure 20:
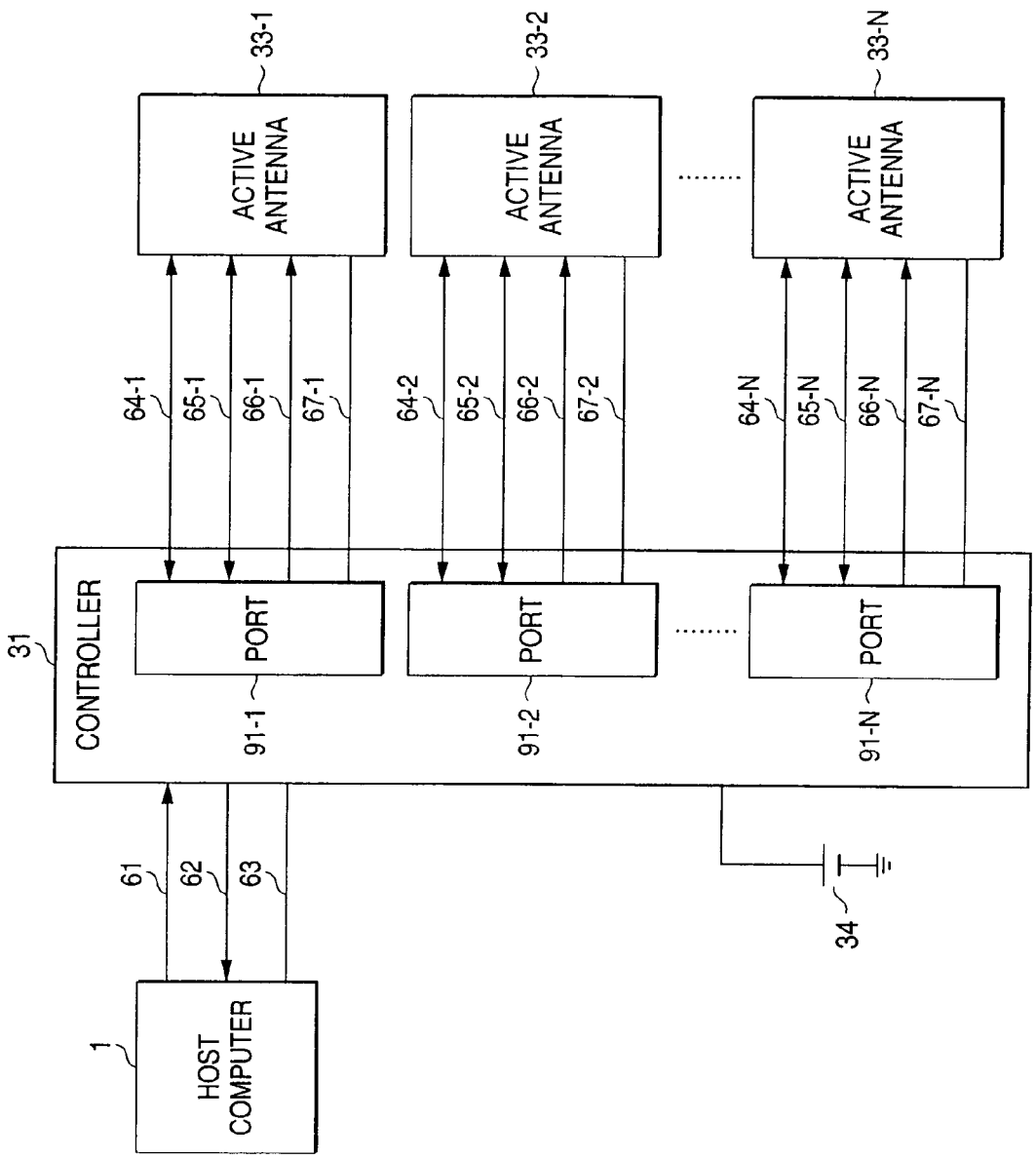
FIG. 20 is a view for explaining the connection relation in a case where a cable of RS232C standard and a cable of RS485 standard are used.

Here, a description will be concretely made on a case where the host computer 1 is connected with the controller 31 by using the cable based on the RS232C standard, and the controller 31 is connected to the respective active antennas 33 by using the cable based on the RS485 standard. As shown in FIG. 20, a command bus 61, a response bus 62, and a ground 63 are respectively provided between the host computer 1 and the controller 31 similarly to the case where the system is constructed in the bus type shown in FIG. 14.

A bus plus 64-1, a bus minus 65-1, a power supply line 66-1, and a ground 67-1 are respectively provided between the controller 31 and the active antenna 33-1. Similarly, a bus plus 64-2, a bus minus 65-2, a power supply line 66-2, and a ground 67-2 are respectively provided between the controller 31 and the active antenna 33-2. Like this, the bus plus 64, the bus minus 65, the power supply line 66, and the ground 67 are provided for the respective active antennas 33 (provided to be in the star type). Incidentally, the power supply line 66 and the ground 67 may be used in common, not for the respective active antennas 33.

Figure 21:
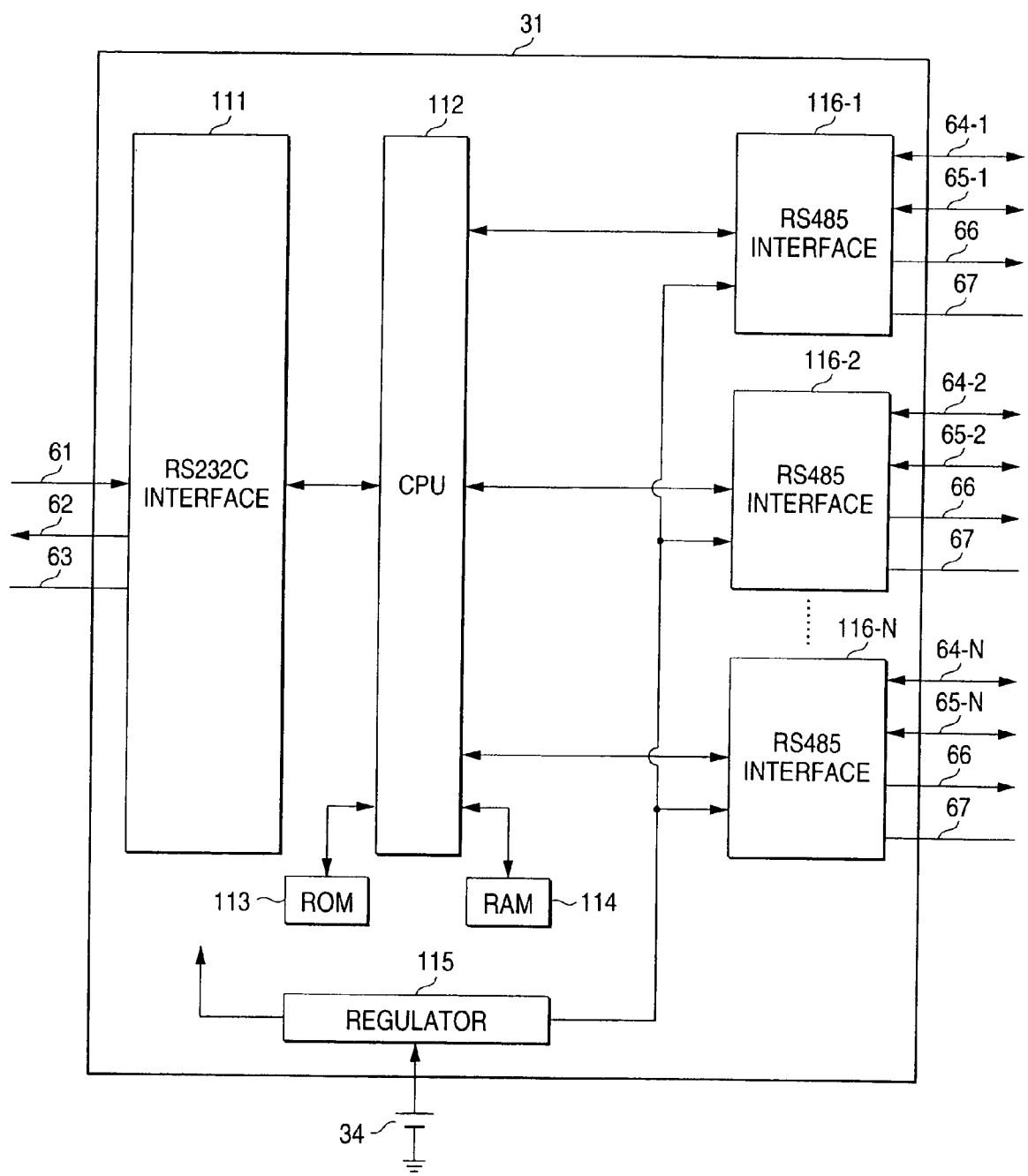
FIG. 21 is a view showing an internal structure of the controller 31 shown in FIG. 20.

FIG. 21 is a view showing an internal structure of the controller 31 shown in FIG. 20. When the correspondence of the structure of the controller 31 shown in FIG. 18 to the structure of the controller 31 shown in FIG. 21 is seen, the interface 101 is constructed by an RS232C interface 111 of the RS232C standard, the digital circuit portion 102 is constructed by a CPU 112, the memory 103 is constructed by a ROM 113 and a RAM 114, and the ports 91-1 to 91-N are constructed by RS485 interfaces 116-1 to 116-N of the RS485 standard, respectively. Besides, the controller 31 shown in FIG. 21 is equipped with a regulator 115 for providing a power supply to each portion. The RS 232C interface 111 interfaces a command transmitted from the host computer 1 and outputs it to the CPU 112. In accordance with a program stored in the ROM 113, the CPU 112 judges that the inputted command is transmitted to which RS 485 interface 116, and outputs the inputted command to the antenna 33.

A command transmitted from the RS485 interface 116 of the controller 31 is inputted to the corresponding RS485 interface 121 of the active antenna 33, is interfaced, and is outputted to the modulating circuit 124 of the analog circuit portion 13. The modulating circuit 124 modulates a carrier signal supplied from the carrier signal generating portion 123 with the inputted data signal to generate a modulated wave, and emits it to the IC card 4 from the antenna 3. A response signal received by the antenna 3 from the IC card 4 is supplied to the demodulating circuit 125, is demodulated, and is transmitted to the controller 31 through the RS485 interface 121.

Like this, in the case where the system is constructed in the star type, if a surplus port 91 is previously prepared in the controller 31, when an active antenna 33 is newly installed, the installation can be easily made. Besides, since it becomes unnecessary to provide a digital circuit portion in the active antenna 33 itself, it becomes possible to miniaturize the structure of the active antenna 33.

Also in the case where the system is constructed in star type, similarly to the case where the system is constructed in the bus type, when necessary, the host computer 1 may specify the ID of the desired active antenna 33 (RS485 interface 116) to transmit a command, or may sequentially change the active antenna discriminating ID in the time-sharing manner to transmit.

Figure 23:
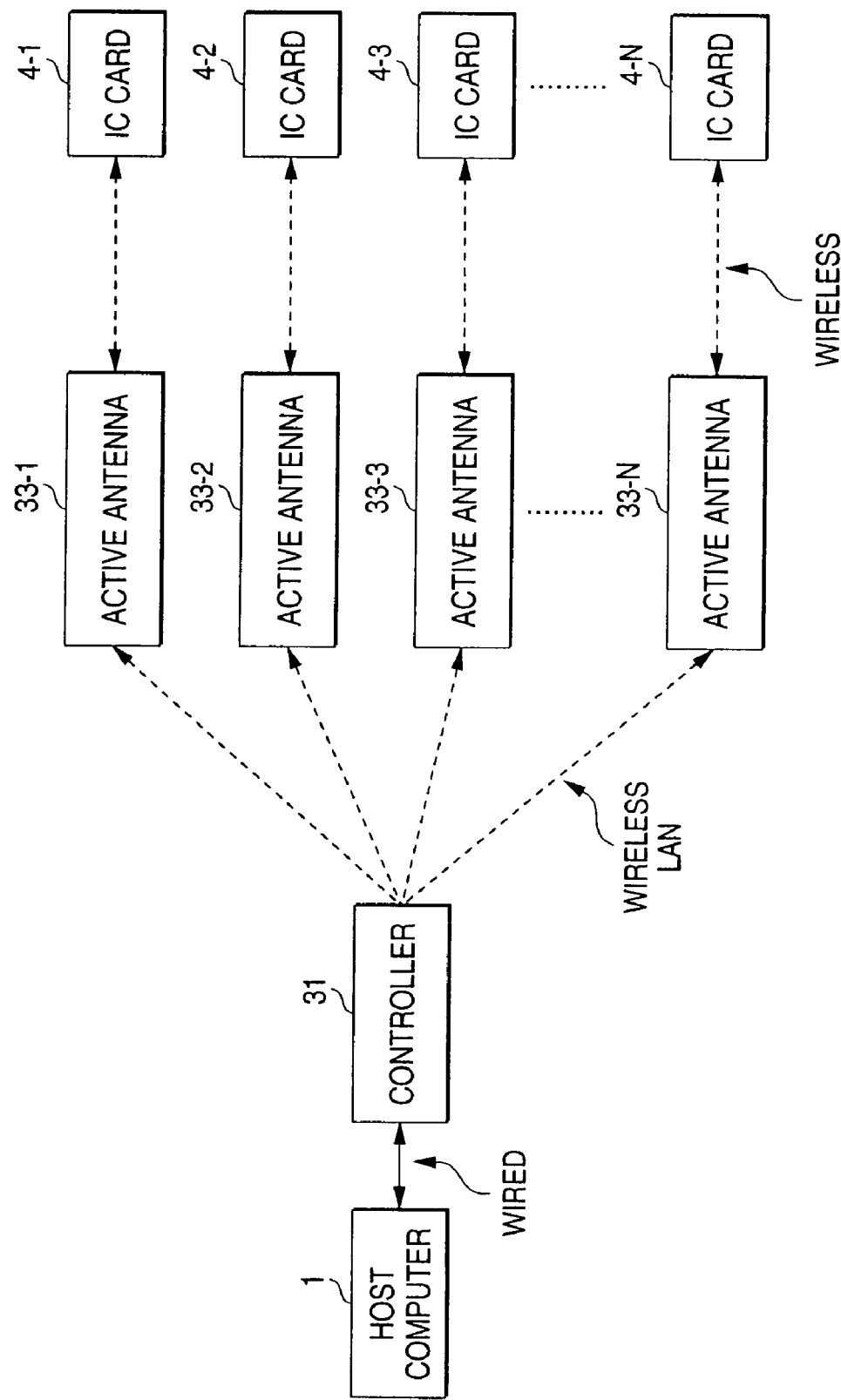
FIG. 23 is a view for explaining still another way of connection between the controller 31 and the active antenna 33.

In the foregoing embodiments of the bus type and the star type, although the description has been made on the case where the wired cable is used to connect the controller 31 with the active antenna 33, as shown in FIG. 23, a wireless LAN (Local Area Network) may be used. By using wireless, since it is not necessary to take wiring of cables or the like into consideration when the structure of the IC card system is changed, it becomes possible to easily change the structure.

Like this, in the case where the controller 31 is connected with the active antenna 33 through the wireless LAN, there are mixed two kinds of wireless communication, that is, wireless communication performed between the controller 31 and the active antenna 33 and wireless communication performed between the active antenna 33 and the IC card 4. An IC card system in which two kinds of wireless communication are mixed will be described below.

Figure 24:
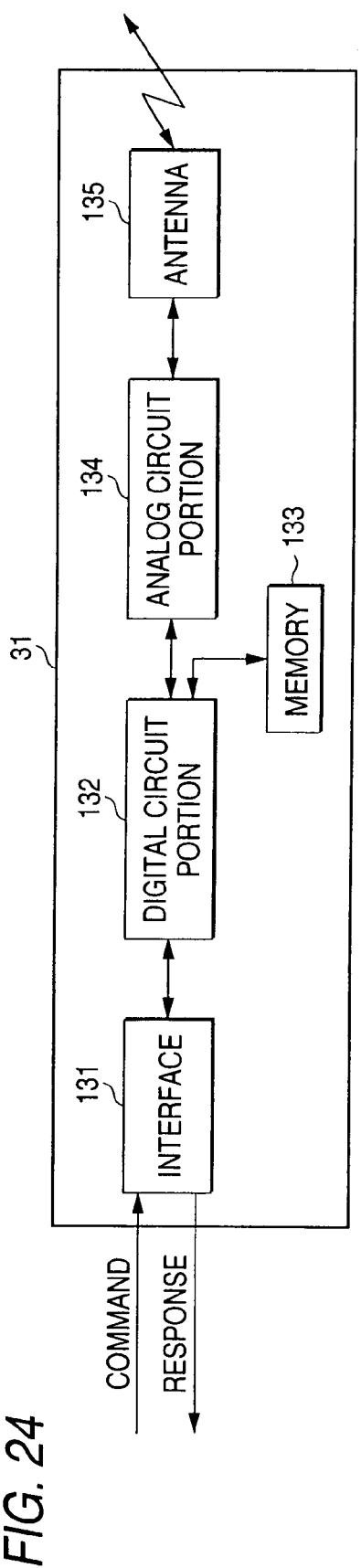
FIG. 24 is a view showing an internal structure of the controller 31 shown in FIG. 23.

FIG. 24 is a view showing an internal structure of the controller 31. An interface 131 interfaces data to the host computer 1. A digital circuit portion 132 performs such processing as to analyze a command inputted from the interface 131 or a response inputted from an analog circuit portion 134. In a memory 133, programs or data necessary for the digital circuit portion 132 to perform processing are stored. An antenna 135 performs such processing as to emit a command from the analog circuit portion 134 to the active antenna 33, or to receive a response from the active antenna 33 to output it to the analog circuit portion 134.

Figure 22:
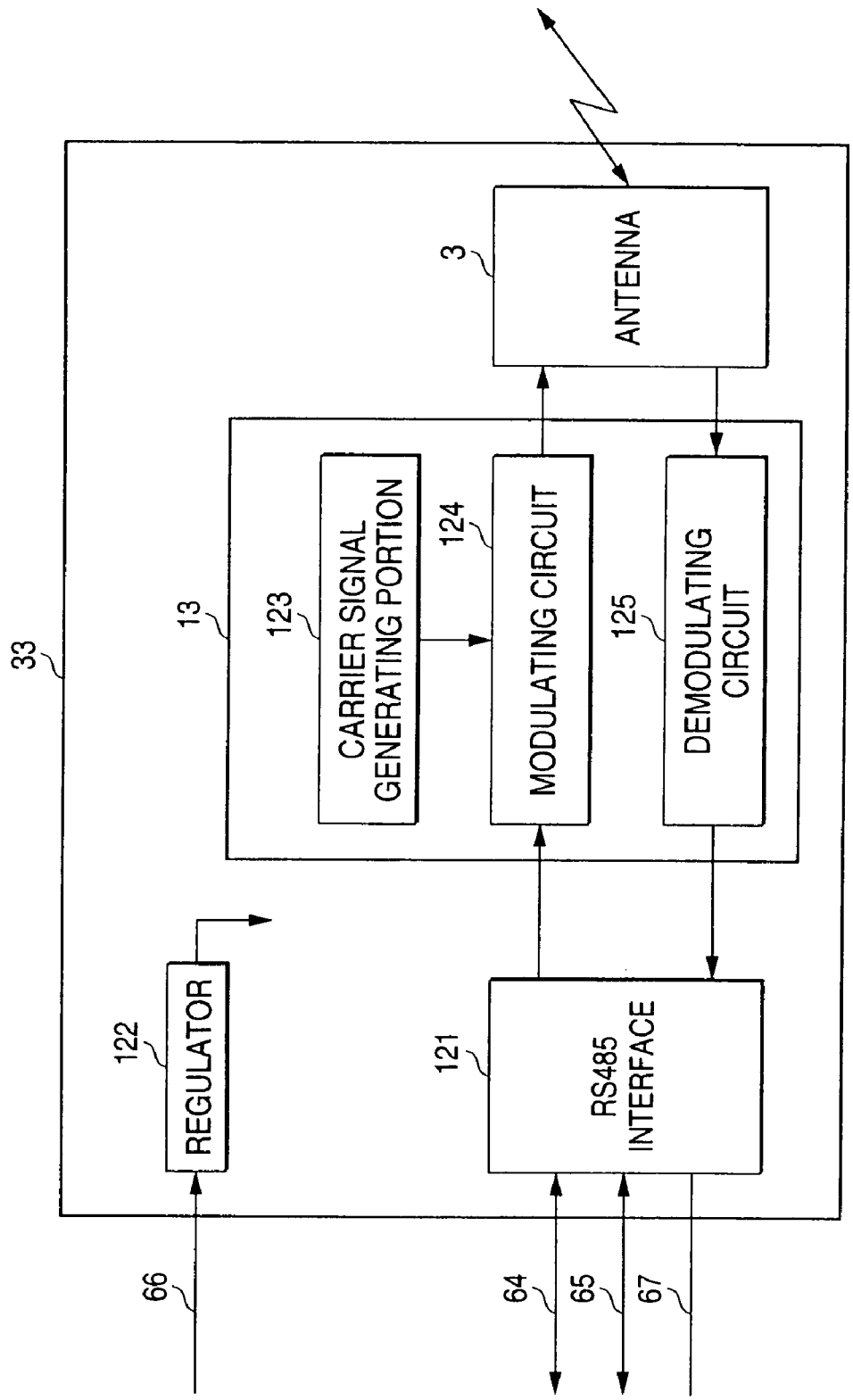
FIG. 22 is a view showing an internal structure of the active antenna 33 shown in FIG. 20.
Figure 25:
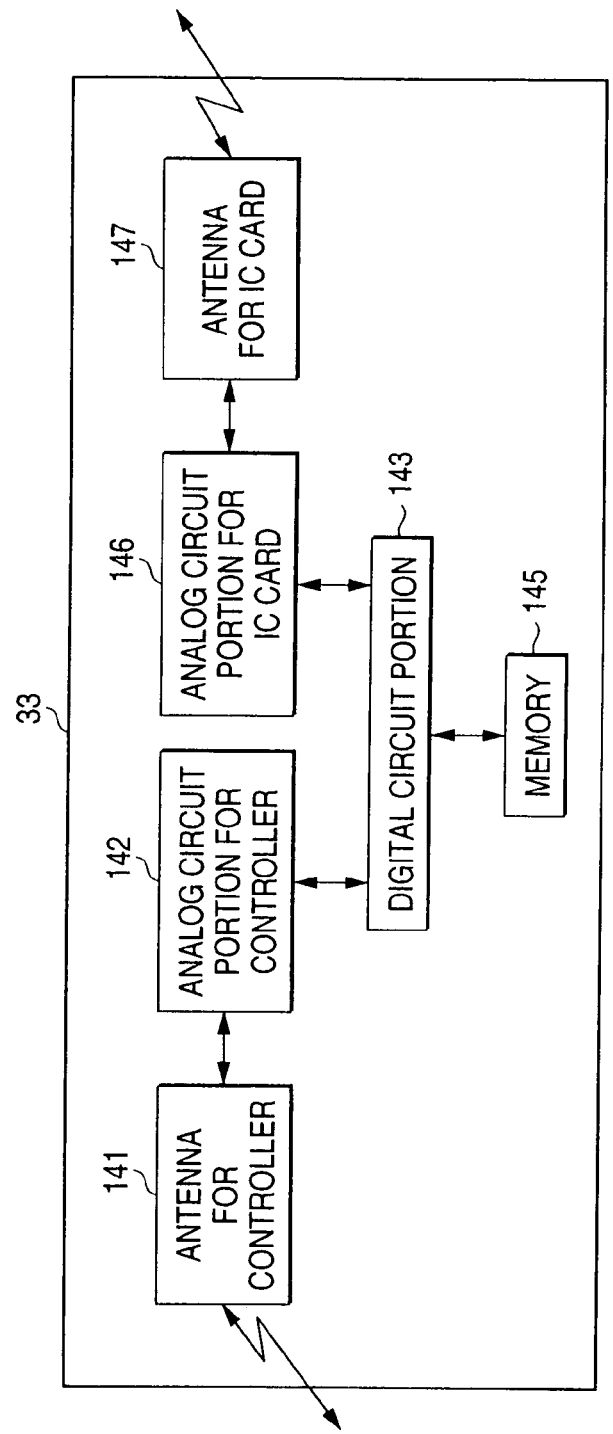
FIG. 25 is a view showing an internal structure of the active antenna 33 shown in FIG. 23.

FIG. 25 is a view showing an internal structure of the active antenna 33. The active antenna 33 is roughly divided into a portion where wireless communication with the controller 31 is performed and a portion where wireless communication with the IC card 4 is performed. As the portion where wireless communication with the controller 31 is performed, an antenna 141 for a controller and an analog circuit portion 142 for a controller are provided. As the portion where wireless communication with the IC card 4 is performed, an analog circuit 146 for an IC card and an antenna 147 for an IC card are provided. The analog circuit portion 142 for the controller and the analog circuit portion 146 for the IC card respectively have the same structure as the analog circuit portion 13 of the active antenna 33 shown in FIG. 22, and perform modulation and demodulation of an inputted signal.

The ID intrinsic to the active antenna 33 is stored in a memory 145, and a digital circuit portion 143 makes such processing as to judge whether or not a command from the analog circuit portion 142 for the controller is directed to itself by checking the ID stored in the memory 145, or as to prepare data by causing its own ID (ID stored in the memory 145) to be contained in a response from the analog circuit portion 146 for the IC card.

Like this, in the case where there are mixed two wireless communications, that is, the wireless communication performed between the controller 31 and the active antenna 33, and the wireless communication performed between the active antenna 33 and the IC card 4, it is necessary to identify between those two wireless communications. In the case of the structure of the active antenna 33 as shown in FIG. 25, since the analog circuit portions for the controller and the IC card, processing the respective wireless communications are provided, the wireless communication with the controller 31 and the wireless communication with the active antenna 33 are distinguished by using signals of different frequency bands. In the case of making such a structure, it is possible to simplify the structure of a program or the like.

Figure 26:
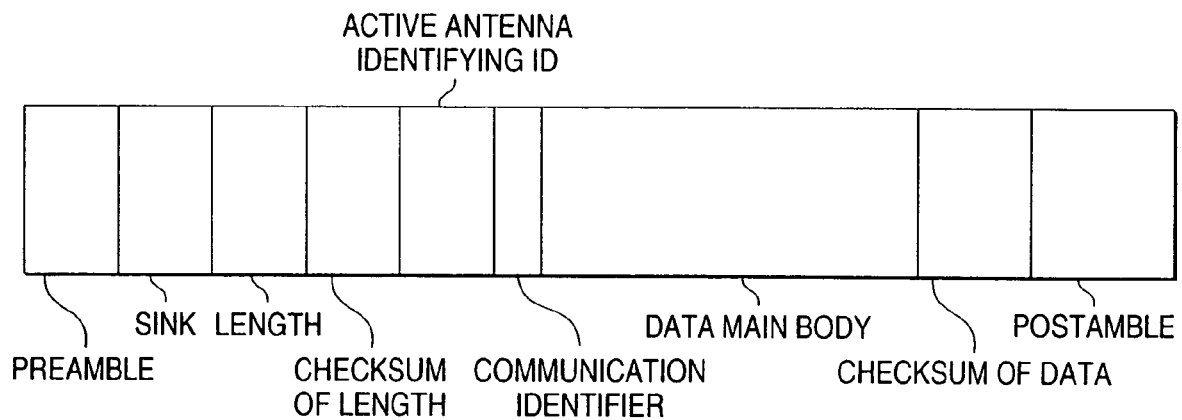
FIG. 26 is a view for explaining a data structure of data transferred between the controller 31 and the active antenna 33 shown in FIG. 23.

As another method of discriminating between the two wireless communications, by using the same carrier signal and causing sink patterns indicating the start of data to be different patterns, it is also possible to distinguish the wireless communication performed between the controller 31 and the active antenna 33 from the wireless communication performed between the active antenna 33 and the IC card 4. It is also possible to distinguish two wireless communications by using an identifier. In the case where two wireless communications are distinguished by using the identifier, as shown in FIG. 26, the data structure is made to include an active antenna discriminating ID for discriminating the active antenna 33 and a communication identifier for distinguishing the wireless communication performed between the controller 31 and the active antenna 33 from the wireless communication performed between the active antenna 33 and the IC card 4. By doing so, it is possible to lessen an occupied frequency band.

Figure 27:
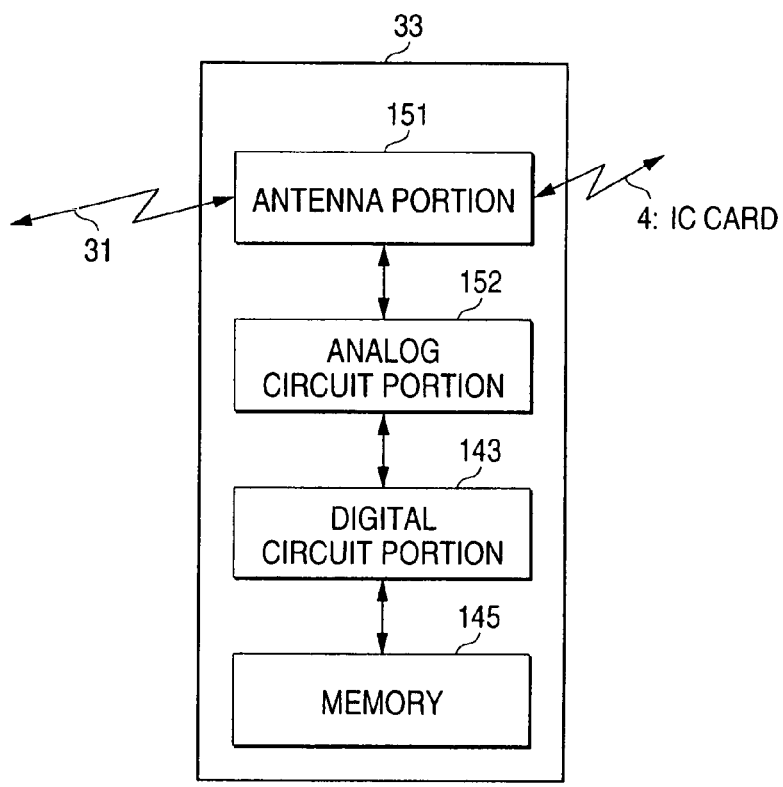
FIG. 27 is a view showing another internal structure of the active antenna 33 shown in FIG. 23.

In the case where the same carrier signal is used, the analog circuit portion 142 for the controller and the analog circuit portion 146 for the IC card can be used in common, and the structure of the active antenna 33 can be miniaturized. In the case where the two analog circuit portions are made to be used in common, the structure of the active antenna 33 becomes as shown in FIG. 27. An antenna portion 151 is used for both wireless communications with the controller 31 and the IC card 4. An analog circuit portion 152 performs such processing as to demodulate a signal from the antenna portion 151 or to generate a signal to the antenna portion 151.

Figure 28:
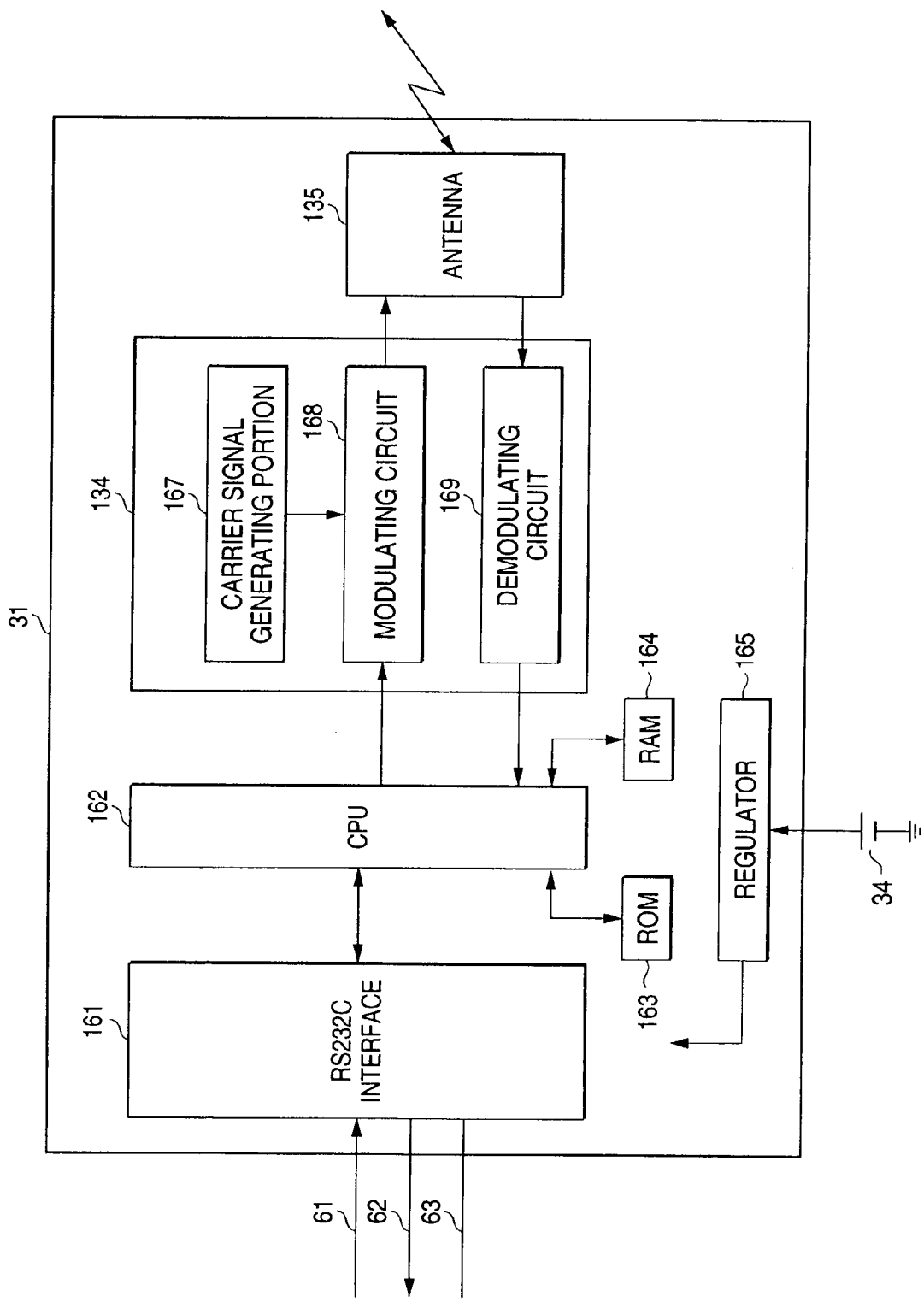
FIG. 28 is a view showing an internal structure of the controller 31 in the case where a cable of RS232C standard is used.

Here, an internal structure of the controller 31 in the case where a cable of the RS232C standard is used for connection between the host computer 1 and the controller 31, and communication between the controller 31 and the active antenna 33 is made wireless communication, will be described with reference to FIG. 28. When the structure of the controller 31 shown in FIG. 28 is compared with the structure of the controller 31 shown in FIG. 24, the interface 131 is constructed by an RS232C interface 161 of the RS232C standard, the digital circuit portion 132 is constructed by a CPU 162, and the memory 133 is constructed by a ROM 163 and a RAM 164. The analog circuit portion 134 is constructed by a carrier signal generating portion 167, a modulating circuit 168, and a demodulating circuit 169. Besides, the controller 31 shown in FIG. 28 is equipped with a regulator 165 for providing a power supply to each portion.

The RS 232C interface 161 interfaces a command transmitted from the host computer 1 and outputs it to the CPU 162. The CPU 162 generates a command data signal containing the ID of the active antenna 33 to which the inputted command is transmitted, in accordance with a program (data) stored in the ROM 163, and outputs it to the modulating circuit 168 of the analog circuit portion 134.

The modulating circuit 168 modulates a carrier signal supplied from the carrier signal generating portion 167 by the inputted command data signal to generate a modulated wave (command signal), and causes the antenna 135 to transmit it to the active antenna 33. Since this transmission is performed to all the active antennas 33, the active antenna 33 judges whether or not it is a signal directed to itself from the active antenna discriminating ID (FIG. 26) contained in the received command signal, and only in the case where judgement is made such that it is a signal directed to itself, processing corresponding to the signal is executed.

Similarly, a response signal from the active antenna 33 is received by the antenna 135, and is supplied to the demodulating circuit 169 of the analog circuit portion 134. Response data demodulated by the demodulating circuit 169 is inputted to the CPU 162. The CPU 162 performs processing in accordance with the program stored in the ROM 163 to the inputted response data, and outputs it to the host computer 1 through the RS232C interface 161.

Figure 29:
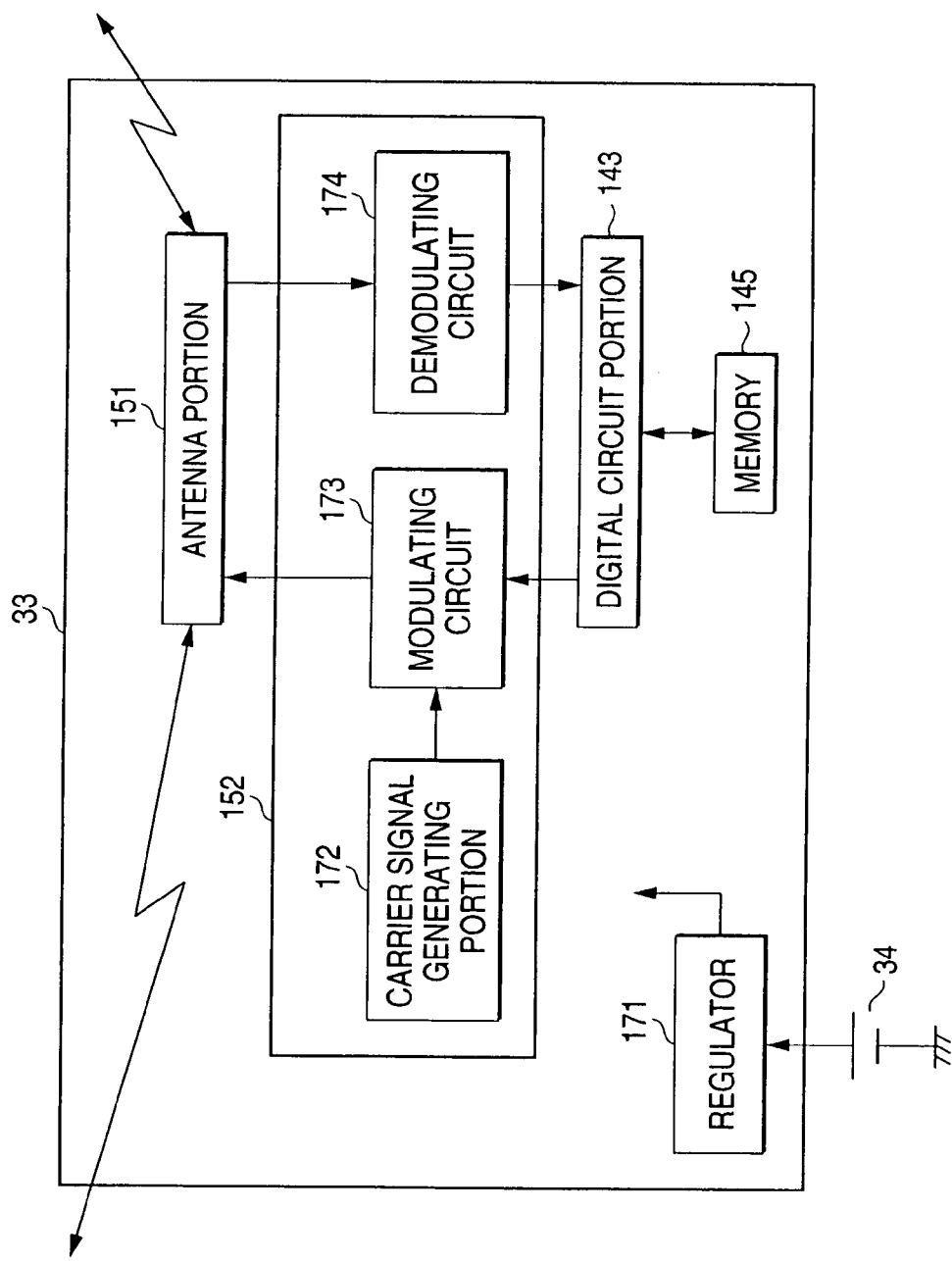
FIG. 29 is a view showing an internal structure of the active antenna 33 corresponding to the controller 31 shown in FIG. 28.

FIG. 29 is a view showing a structure of the active antenna 33 corresponding to the controller 31 shown in FIG. 28. In this structure, a regulator 171 is added to the active antenna 33 shown in FIG. 27, and an internal structure of the analog circuit portion 152 is concretely indicated. Since the analog circuit portion 152 is made to have the same structure as the analog circuit portion 134 of the controller 31 shown in FIG. 28 and its operation is also basically the same, its description is omitted.

Like this, by using the wireless communication also for the communication between the controller 1 and the active antenna 33, even in the case where the system structure is changed, differently from the wired case, since the change in wiring or the like is easy, the reconstruction of the system can be simply performed.

In any of the embodiments of the bus type, the star type, and the wireless system, in the case where the structure of the IC card system is changed, for example, in the case where an active antenna 33 is newly added, it is designed such that at the point of time when electric power is supplied to the newly added active antenna 33, a signal indicating new addition is outputted from the active antenna 33 to the controller 31. Alternatively, the controller 31 is made to have functions to detect the total number of the active antennas 33 and the structure of the system, and to identify the respective active antennas 33. For example, a table of ID is held and in the case where it is judged that a new active antenna 33 is connected, this table of ID is renewed. By doing so, it becomes possible to enhance the flexibility and generality of the system.

Incidentally, in the foregoing embodiments, although the description has been made on the case where the host computer 1 is connected with the controller 31 by wire, transfer of data may be made by wireless communication. Besides, it is also possible to make such a structure that the host computer 1 and the controller 31 are integrated.

Figure 30A:
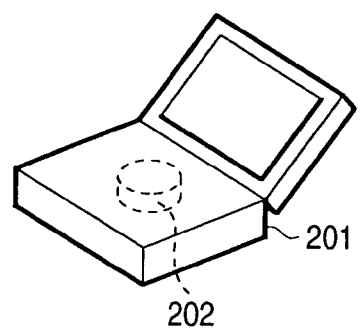
FIGS. 30A to 30C are views for explaining a medium.

Next, with reference to FIGS. 30A to 30C, a description will be made on a medium which is used for installing a program for execution of the foregoing series of processings into a computer and bringing it in a state executable by the computer. As shown in FIG. 30A, the program can be provided to a user in a state where it is previously installed in a hard disk 202 or the like as a built-in recording medium of a personal computer 201.

Figure 30B:
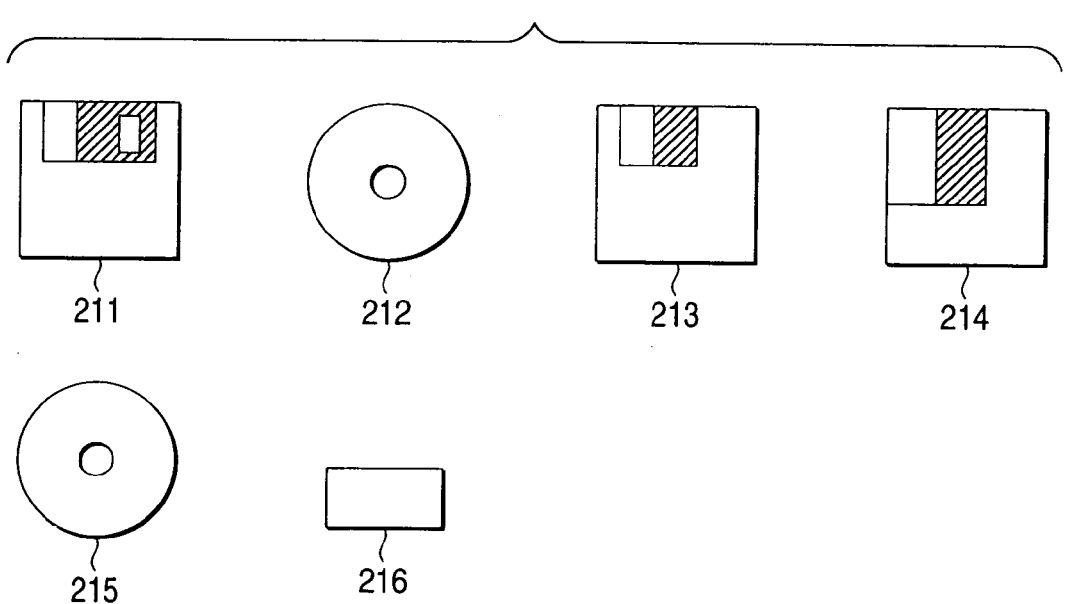

Alternatively, as shown in FIG. 30B, the program is temporarily or permanently stored in a recording medium such as a floppy disk 211, a CD-ROM 212, an MO disk 213, a DVD 214, a magnetic disk 215, or a semiconductor memory 216, and can be provided as package software.

Figure 30C:
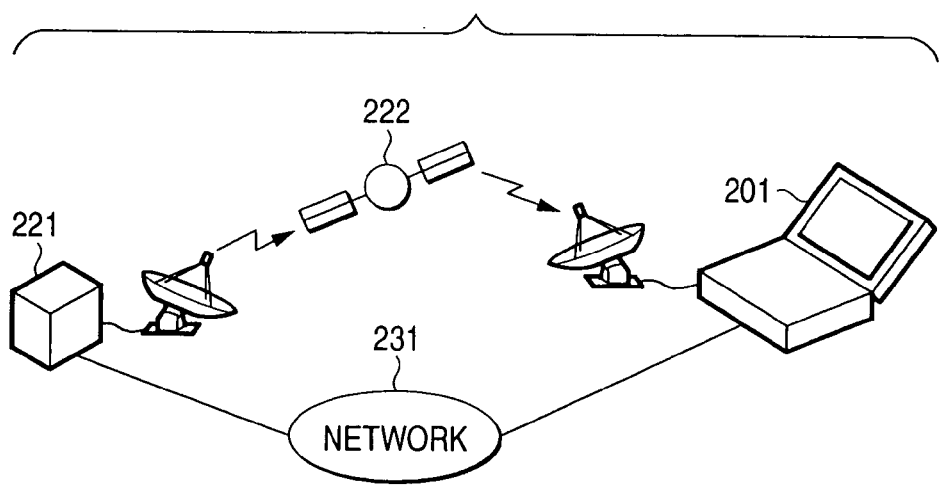

Further, as shown in FIG. 30C, the program can be transferred to the personal computer 201 from a download site 221 through a satellite 222 by wireless, or can be transferred to the personal computer 201 through a network 231, such as a local area network or Internet, by wire or wireless, and in the personal computer 201, it can be downloaded in a built-in hard disk or the like.

The medium in the present specification means a wide conception including all these media.

As described above, in the information processing apparatus of the first aspect of the invention, the information processing method of the seventh aspect of the invention, and the medium of the eighth aspect of the invention, a command is outputted to a plurality of devices, a response to the command, outputted from the plurality of devices, is inputted, and the plurality of devices are identified. Thus, it becomes possible for one information processing apparatus to control the plurality of devices.

In the information processing apparatus of the ninth aspect of the invention, the information processing method of the twelfth aspect of the invention, and the medium of the thirteenth aspect of the invention, an inputted command is analyzed, a signal corresponding to the analysis result is transmitted to another device, a response to the transmitted signal is received from the other device, and a signal corresponding to the received response is outputted to a device having outputted the command. Thus, it becomes possible for one apparatus to control a plurality of information processing devices.

In the control apparatus of the information processing system of the fourteenth aspect of the invention, the information processing method of the eighteenth aspect of the invention, and the medium of the nineteenth aspect of the invention, a control device outputs a command and identifies a plurality of analysis devices, the analysis device analyzes the command, transmits a signal corresponding to the analysis result to an information storage device, receives a response to the transmitted signal from the information storage device, and transfers a signal corresponding to the received response to the control device, and the information storage device stores predetermined information, receives the signal corresponding to the transmitted analysis result, reads out information corresponding to the signal, and transmits it as the response to the analysis device. Thus, it becomes possible to simplify the structure of the information processing system.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An information processing system comprising a control device, a plurality of analysis devices connected to the control device, and an information storage device, wherein the control device comprises:
   a plurality of output terminals for outputting data that includes at least identification data and a command signal; and
   identification means using the identification data for discriminating among the plurality of analysis devices, which are connected to the plurality of output terminals of the control device respectively, each analysis device comprises:
   analysis means for analyzing the identification data and command signal outputted by the output terminal, wherein the identification data is used by each analysis device to determine whether to process the command signal;
   transmission means for transmitting a signal corresponding to an analysis result of the analysis means to the information storage device wherein a response corresponding to the signal can be outputted;
   reception means for receiving the response outputted from the information storage device; and
   transfer means for transferring a signal corresponding to the response received by the reception means to the control device, wherein each analysis device is further used for converting data received from the control device into a format suitable for the transmission means and for converting the response from the reception means into a format suitable for the control device, and wherein the information storage device comprises:
   storage means for storing predetermined information; and
   response transmission means for receiving the signal transmitted by the transmission means and corresponding to the analysis result, for reading out information corresponding to the signal from the storage means, and for transmitting it as the response to at least one of the analysis devices, wherein the information storage device performs transfer of data to said analysis device by using wireless communication.

2. An information processing system according to claim 1, wherein the information storage device is of a portable card type.

3. An information processing system according to claim 1, wherein electric power of the analysis device is supplied from the control device.

4. An information processing system according to claim 1, wherein the control device and the analysis device perform transfer of data by wireless.

5. An information processing method for an information processing system comprising a control device, a plurality of analysis devices connected to the control device, and an information storage device, wherein an information processing method of the control device comprises:
   an output step of outputting data including at least identification data and a command from a plurality of output devices; and
   an identification step of using the identification data for discriminating among the plurality of analysis devices, which are connected to the plurality of output terminals of the control device respectively,
wherein an information processing method of each analysis device comprises:
   an analysis step of analyzing the identification data and command outputted at the output step, wherein the identification data is used by each analysis device to determine whether to process the command;
   a transmission step of transmitting a signal corresponding to an analysis result at the analysis step to the information storage device by using wireless communication wherein a response corresponding to the signal can be outputted;
   a reception step of receiving the response outputted from the information storage device; and a transfer step of transferring a signal corresponding to the response received at the reception step to the control device, wherein each analysis device is further used for converting data received from the control device into a format suitable for the transmission means and for converting the response from the reception means into a format suitable for the control device, and wherein an information processing method of the information storage device comprises:

a storage step of storing predetermined information; and a response transmission step of receiving the signal transmitted at the transmission step and corresponding to the analysis result, reading out information corresponding to the signal from the storage step, and transmitting it as the response to the analysis device.

6. A medium for causing, in an information processing system comprising a control device, a plurality of analysis devices connected to the control device, and an information storage device, a control device to execute a program comprising:

an output step of outputting data including at least identification data and a command from a plurality of output devices; and an identification step of using the identification data for discriminating among the plurality of analysis devices, which are connected to the plurality of output terminals of the control device respectively, for causing each analysis device to execute a program comprising:

an analysis step of analyzing the identification data and command outputted at the output step, wherein the identification data is used by each analysis device to determine whether to process the command;

a transmission step of transmitting a signal corresponding to an analysis result at the analysis step to the information storage device by using wireless communication wherein a response corresponding to the signal can be outputted;

a reception step of receiving the response outputted from the information storage device; and a transfer step of transferring a signal corresponding to the response received at the reception step to the control device, and for causing the information storage device to execute a program comprising:

a storage step of storing predetermined information, wherein each analysis device is further used for converting data received from the control device into a format suitable for the transmission means and for converting the response from the reception means into a format suitable for the control device; and a response transmission step of receiving the signal transmitted at the transmission step and corresponding to the analysis result, reading out information corresponding to the signal from the storage step, and transmitting it as the response to the analysis device.

7. An information processing apparatus for processing an information storage device by using a control device, said information processing apparatus, said information storage device and said control device being comprised of an information processing system, said information processing apparatus comprising:

input means for inputting data including identification data and a command transmitted from a plurality of output devices of the control device;

analysis means for analyzing the identification data and the command received by the input means, the analysis means being connected to the plurality of output terminals of the control device respectively, wherein the identification data is used to determine whether to process the command;

an antenna for transmitting a signal corresponding to an analysis result of the analysis means to said information storage device and receiving a response to the signal from the information storage device, said signal being transmitted by using wireless communication; and output means for outputting a signal corresponding to the response received by the antenna to the control device, wherein the analyses means is further used for converting data received from the control device into a format suitable for the transmission means to and for converting the response from the reception means into a format suitable for the control device.

8. An information processing system according to claim 1, wherein the output means of said control device outputs the same data to said plurality of analysis devices.

9. An information processing system according to claim 1, wherein the control device further comprises a table storage means for storing a table of intrinsic IDs respectively given to each of the plurality of analysis devices, wherein the identification means performs identification by using the table of the IDs.

10. An information processing system according to claim 1, wherein the control device further comprises ports according to the plurality of analysis devices wherein the identification means identify the plurality of analysis devices by discriminating the ports.

11. An information processing system according to claim 1, wherein the identification means of said control device sequentially outputs the command outputted by the output terminals to the plurality of analysis devices in a time-sharing manner, so that the plurality of analysis devices are identified.

12. An information processing system according to claim 1, wherein the analysis device further comprises an ID storage means for storing an intrinsic ID.

13. An information processing method for an information processing system comprising a control device, a plurality of analysis devices connected to the control device, and an information storage device, the information processing method comprising the steps of:

outputting data including identification data and a command from a plurality of output devices of the control device to the plurality of analysis devices, which are connected to the plurality of output terminals of the control device respectively;

analyzing the identification data and the command received from the control device to transmit an analysis result to the information storage device, wherein the identification data is used to determine whether to process the command;

transmitting a signal corresponding to the analysis result from an analysis device to the information storage device by using wireless communication;

transmitting a response to the signal from the information storage device to said analysis device; and outputting a signal according to the response to the control device, wherein each analysis device is further used for converting data received from the control device into a format suitable for transmission in the transmitting step and for converting the response in the outputting step into a format suitable for the control device.

14. An information processing method according to claim 13, wherein information stored in the information storage device are read out as responses according to the transmitted signal.

15. An information processing system used for processing the data from a host computer, the information processing system comprising:
- a control device including:
  - a receiving terminal for receiving the data the host computer, the data including at least identification data and command data;
  - a plurality of output terminals for outputting said data; and
  - an identification means using the identification data for identifying the respective output terminals from the received data;
- a plurality of active antennas(33-1 . . . 33-N), which are connected to the plurality of output terminals of the control device respectively, each of the active antennas including:
  - an analysis means for analyzing the data received from the control device for determining the identified data and a command signal, wherein the identification data is used to determine whether to process the command signal;
  - a transmission means for transmitting the command signal determined by the analysis means to an information storage device;
  - a reception means for receiving a response from the information storage device; and
  - a transfer means for transferring the response from the information storage device to the control device,
  - wherein the active antenna is further used for converting the data received from the control device into a format suitable for the transmission means to the and for converting the response from the reception means into a format suitable for the control device; and
- an information storage device, including:
  - a storage means for storing predetermined information; and
  - a response transmission means for receiving the command signal from the transmission means of the active antenna, for reading out the predetermined information from the storage means according to the command signal and for transferring the predetermined information as the response to the reception means of the active antenna.

16. An information processing method for an information processing system used for processing data from a host computer comprising a control device, a plurality of active antennas connected to a plurality of output terminals of the control device, and an information storage device, wherein the information processing method of the control device comprises:
- receiving data from the host computer at a receiving terminal, the data including at least identification data and command data;
- outputting the data from a plurality of output terminals;
- identifying the respective output terminals from the received data using the identification data,
- wherein an information processing method for each active antenna comprises:
  - analyzing the data received from the outputting step and for determining the identification data and a command signal, wherein the identification data is used by each analysis device to determine whether to process the command signal;
  - transmitting the command signal determined in the analyzing step to an information storage device;
  - receiving a response from the information storage device;
  - transferring the response from the information storage device to the control device, wherein each active antenna is further used for converting the data received from the control device into a format suitable for the transmission means and for converting the response from the reception means into a format suitable for the control device, and wherein an information processing method for the information storage device comprises:
- storing predetermined information;
- receiving the command signal from the transmission step;
- reading out the predetermined information from the storage step according to the command signal; and
- transferring the predetermined information as the response to the receiving step of the active antennas.

* * * * *